(12) United States Patent
Taki et al.

(10) Patent No.: US 11,100,944 B2
(45) Date of Patent: Aug. 24, 2021

(54) INFORMATION PROCESSING APPARATUS, INFORMATION PROCESSING METHOD, AND PROGRAM

(71) Applicant: SONY CORPORATION, Tokyo (JP)

(72) Inventors: Yuhei Taki, Kanagawa (JP); Shinichi Kawano, Tokyo (JP); Yusuke Nakagawa, Kanagawa (JP); Kunihito Sawai, Kanagawa (JP); Ayumi Kato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 572 days.

(21) Appl. No.: 16/077,607

(22) PCT Filed: Jan. 24, 2017

(86) PCT No.: PCT/JP2017/002213
§ 371 (c)(1),
(2) Date: Aug. 13, 2018

(87) PCT Pub. No.: WO2017/179262
PCT Pub. Date: Oct. 19, 2017

(65) Prior Publication Data
US 2021/0193168 A1 Jun. 24, 2021

(30) Foreign Application Priority Data
Apr. 12, 2016 (JP) .............................. JP2016-079571

(51) Int. Cl.
*G10L 25/63* (2013.01)
*H04L 12/58* (2006.01)
(Continued)

(52) U.S. Cl.
CPC .............. *G10L 25/63* (2013.01); *G06F 3/165* (2013.01); *G06F 3/167* (2013.01); *G10L 15/083* (2013.01);
(Continued)

(58) Field of Classification Search
CPC ................... G10L 25/63; G10L 15/083; G10L 2015/088; G06F 3/165; G06F 3/167; H04L 51/04; H04L 51/34
See application file for complete search history.

(56) References Cited

U.S. PATENT DOCUMENTS 7,895,277 B2 * 2/2011 Drory .................. G06Q 10/107
709/206
9,306,899 B1 * 4/2016 Vendrow ............... H04L 51/043
(Continued)

FOREIGN PATENT DOCUMENTS

JP   H09-081632 A   3/1997
JP   2004-129174 A   4/2004
(Continued)

*Primary Examiner* — Mohammad K Islam
(74) *Attorney, Agent, or Firm* — Paratus Law Group, PLLC

(57) ABSTRACT

There is provided an information processing apparatus, information processing method, and program capable of causing convenience in a situation in which messages are exchanged between users to be improved. The information processing apparatus includes: an output control unit that controls an output of information indicating a waiting status of a first user in relation to a reply from a second user who uses a text input, on a basis of detection of speech of the first user who uses a sound input. Input messages are exchanged between the first user and the second user.

20 Claims, 21 Drawing Sheets

(51) Int. Cl.
*G06F 3/16* (2006.01)
*G10L 15/08* (2006.01)

(52) U.S. Cl.
CPC .............. *H04L 51/04* (2013.01); *H04L 51/34* (2013.01); *G10L 2015/088* (2013.01)

(56) References Cited

U.S. PATENT DOCUMENTS

| | | | |
|---|---|---|---|
| 10,453,449 B2 * | 10/2019 | Devaraj | G10L 15/22 |
| 10,580,404 B2 * | 3/2020 | Devaraj | H04L 51/10 |
| 10,630,939 B2 * | 4/2020 | Van Os | H04M 1/72439 |
| 2017/0103679 A1 * | 4/2017 | Campbell | G06F 40/274 |
| 2018/0309801 A1 * | 10/2018 | Rathod | H04L 67/141 |

FOREIGN PATENT DOCUMENTS

| | | | |
|---|---|---|---|
| JP | 2004-170983 A | 6/2004 |
| JP | 2008-070994 A | 3/2008 |
| JP | 2009-003040 A | 1/2009 |
| JP | 2014-029670 A | 2/2014 |

\* cited by examiner

FIG. 6

| SPEAKING SPEED \ SOUND VOLUME | LARGER THAN ORDINARY | ORDINARY | SMALLER THAN ORDINARY |
|---|---|---|---|
| HIGHER THAN ORDINARY | 0.5 | 0.8 | 1.0 |
| ORDINARY | 0.8 | 1.0 | 1.0 |
| LOWER THAN ORDINARY | 1.0 | 1.0 | 1.0 |

FIG. 7

| AMOUNT OF SWEAT \ FEELING ESTIMATION | ANGRY | SAD | HAVING FUN |
|---|---|---|---|
| LARGER THAN ORDINARY | 0.5 | 0.8 | 1.0 |
| ORDINARY | 0.8 | 1.0 | 1.0 |
| SMALLER THAN ORDINARY | 1.0 | 1.0 | 1.0 |

FIG. 11
(a) 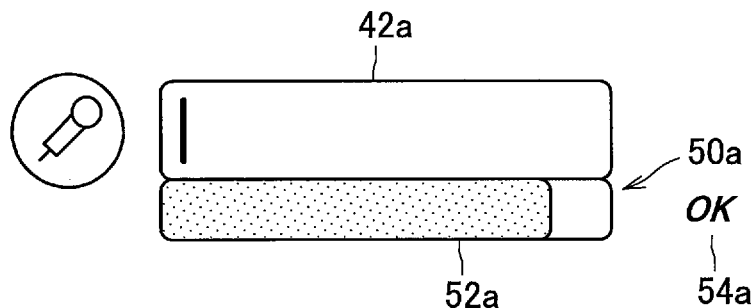
(b) 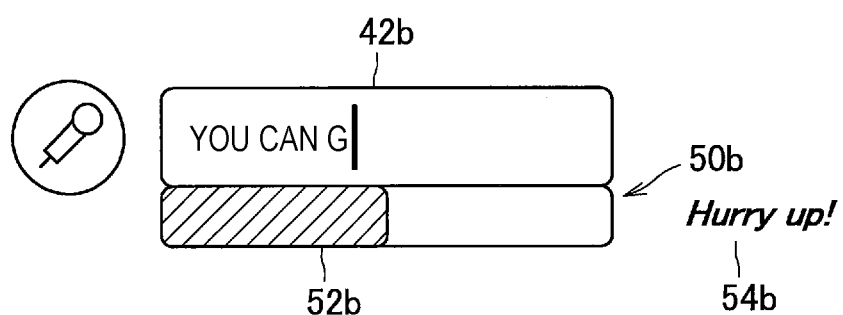
(c) 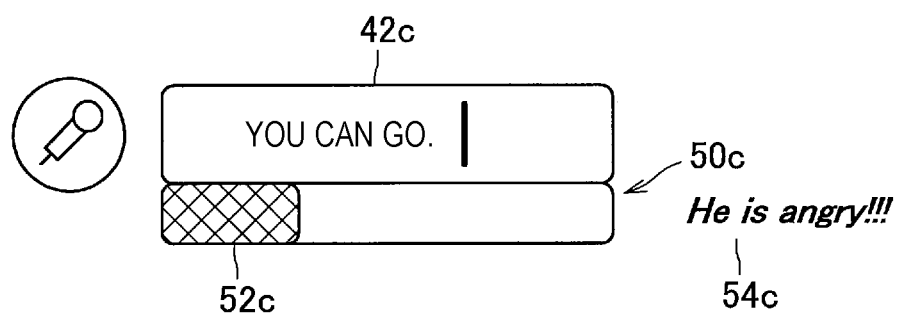
(d) 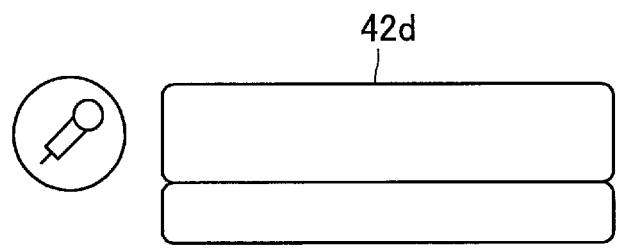

FIG.12
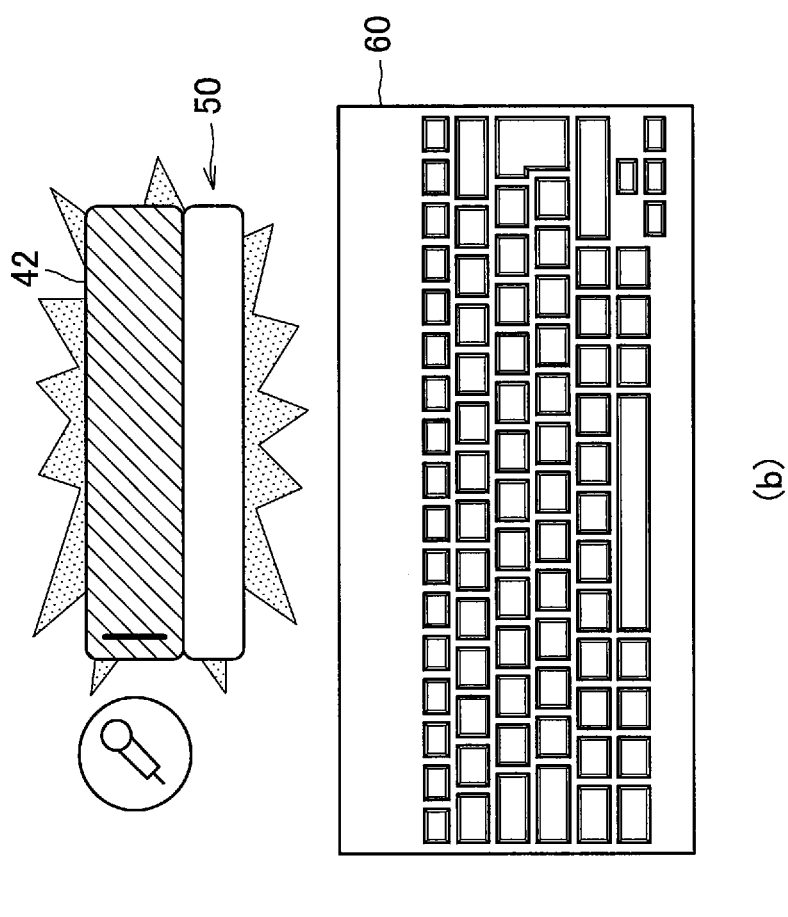
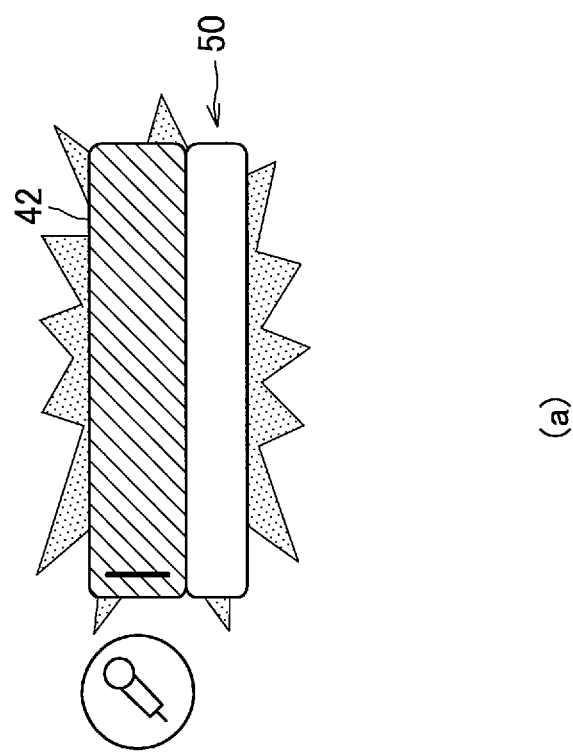

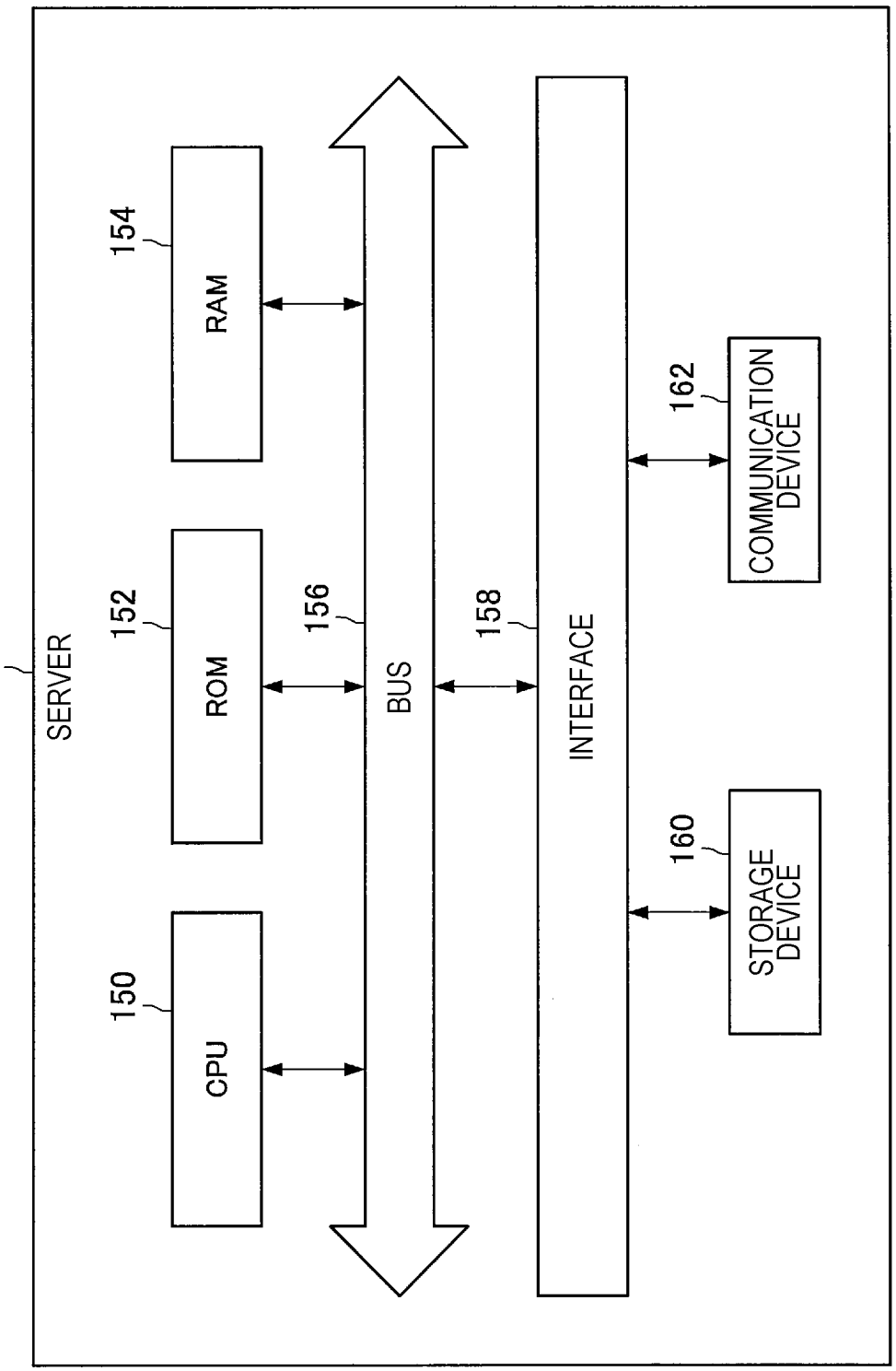

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/002213 (filed on Jan. 24, 2017) under 35 U.S.C. § 371, which claims priority to Japanese Patent Application No. 2016-079571 (filed on Apr. 12, 2016), which are all hereby incorporated by reference in their entirety.

TECHNICAL FIELD

The present disclosure relates to an information processing apparatus, an information processing method, and a program.

BACKGROUND ART

Conventionally, various technologies for performing communication between users via networks, such as chatting, for example, have been developed. Through chatting, participants can exchange text, sound, and the like in real time.

In addition, technologies for converting text information and sound information have also been proposed. For example, Patent Literature 1 listed below describes a technology of converting text input by one user into sound data and outputting the converted sound date to an earphone that another user utilizes.

CITATION LIST

Patent Literature

Patent Literature 1: JP 2004-129174A

SUMMARY OF INVENTION

Technical Problem

Incidentally, if it is assumed that the technology described in Patent Literature 1 is applied to a situation in which messages are exchanged between users, a user is not notified of information related to a status of a counterpart user according to the technology described in Patent Literature 1. Therefore, according to the technology described in Patent Literature 1, it is difficult for a user to ascertain a status in which a counterpart user is waiting for a message from the user, for example.

Thus, the present disclosure will propose novel and improved information processing apparatus, information processing method, and program capable of causing convenience in a situation in which messages are exchanged between users to be improved.

Solution to Problem

According to the present disclosure, there is provided an information processing apparatus including: an output control unit that controls an output of information indicating a waiting status of a first user in relation to a reply from a second user who uses a text input, on a basis of detection of speech of the first user who uses a sound input. Input messages are exchanged between the first user and the second user.

In addition, according to the present disclosure, there is provided an information processing method including: controlling, by a processor, an output of information indicating a waiting status of a first user in relation to a reply from a second user who uses a text input, on a basis of detection of speech of the first user who uses a sound input. Input messages are exchanged between the first user and the second user.

In addition, according to the present disclosure, there is provided a program that causes a computer to function as: an output control unit that controls an output of information indicating a waiting status of a first user in relation to a reply from a second user who uses a text input, on a basis of detection of speech of the first user who uses a sound input. Input messages are exchanged between the first user and the second user.

Advantageous Effects of Invention

According to the present disclosure, it is possible to improve convenience in a situation in which messages are exchanged between users as described above.

Note that the advantage described here is not necessarily limiting, and any advantages described in the present disclosure may be achieved.

BRIEF DESCRIPTION OF DRAWINGS

FIG. 6 is an explanatory diagram illustrating a configuration example of a speech property coefficient table 126 according to the first embodiment.

FIG. 7 is an explanatory diagram illustrating a configuration example of a sensing information coefficient table 128 according to the first embodiment.

FIG. 11 is an explanatory diagram illustrating a display example of an indicator according to the first embodiment.

FIG. 12 is an explanatory diagram illustrating a display example of an indicator according to the first embodiment.

FIG. 21 is an explanatory diagram illustrating a hardware configuration example of a server 10 shared by the respective embodiments.

DESCRIPTION OF EMBODIMENTS

Figure 1:
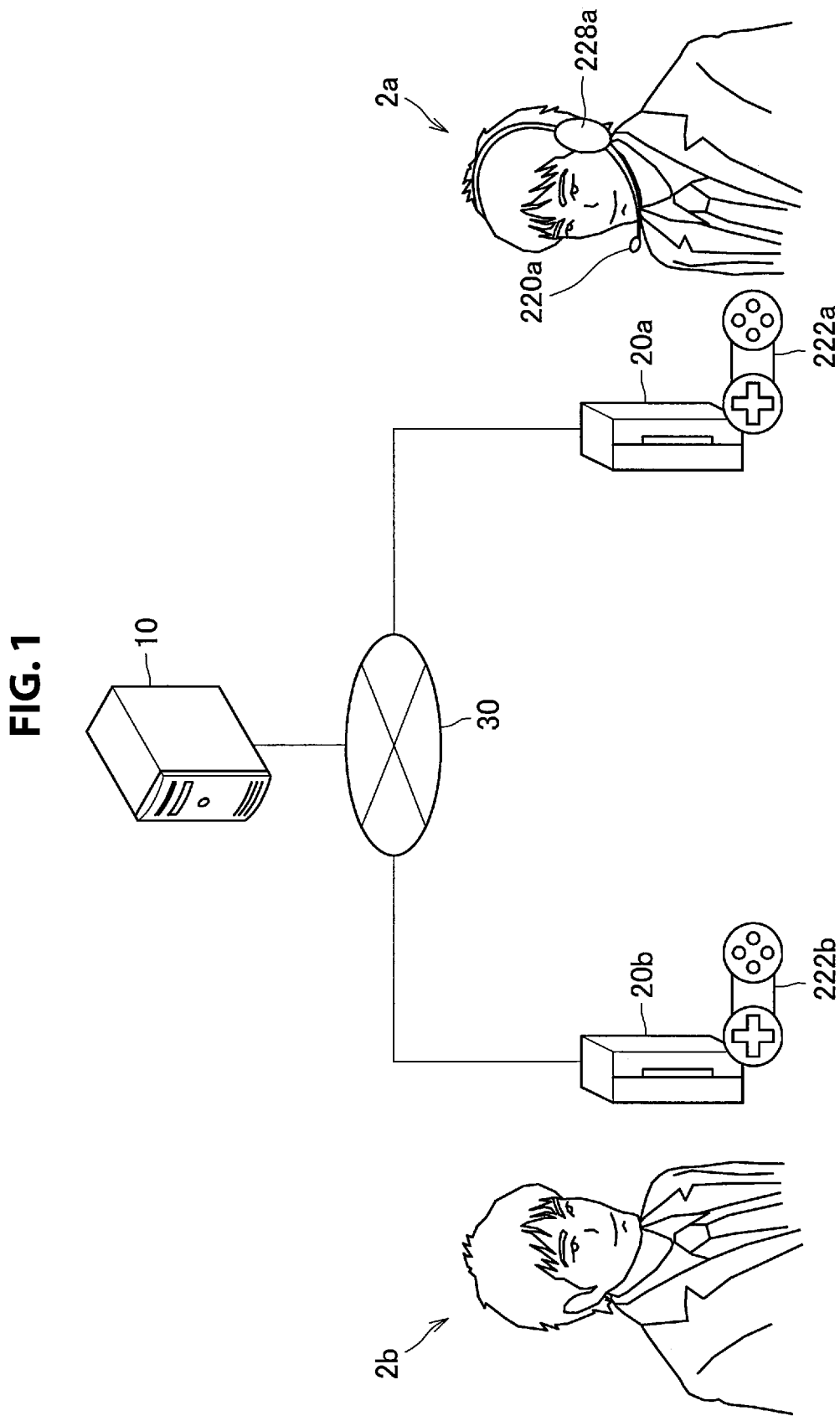
FIG. 1 is an explanatory diagram illustrating a configuration example of an information processing system shared by the respective embodiments.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, a plurality of components that have substantially the same functional configurations are distinguished by adding different letters to ends of the same reference numerals in some cases in the specification and the drawings. For example, a plurality of components that have substantially the same functional configurations are distinguished as a terminal 20a and a terminal 20b as needed. However, only the same reference numerals are added in a case in which it is not particularly necessary to distinguish the plurality of respective components that have substantially the same functional configurations. In a case in which it is not particularly necessary to distinguish the terminal 20a and the terminal 20b, for example, the terminal 20a and the terminal 20b will be simply referred to as terminals 20.

In addition, the "Description of Embodiments" will be described in the order of items described below.
1. Configuration of information processing system
2. First Embodiment
3. Second Embodiment
4. Third Embodiment
5. Fourth Embodiment
6. Hardware configuration
7. Modification example

1. Configuration of Information Processing System

First, a configuration example of an information processing system shared by the respective embodiments of the present disclosure will be described with reference to FIG. 1. As illustrated in FIG. 1, the information processing system shared by the respective embodiments includes a server 10, a terminal 20, and a communication network 30.

In the respective embodiments of the present disclosure, a situation in which two users 2 perform chatting, for example, is assumed. More specifically, one user 2a performs chatting through sound inputs (sound chatting), and the other user 2b performs chatting through text inputs (text chatting). For example, the two users perform chatting while playing the same video game. Note that in the text chatting, the user can input text by using an input device such as a keyboard, for example, a software keyboard that is displayed on a display screen, or the like or can input text through sound text inputs.

<1-1. Terminal 20>

The terminals 20 are devices that the users 2 use for performing chatting. Note that, although FIG. 1 illustrates an example in which the terminals 20 are game consoles, the terminals 20 are not limited to such an example. For example, the terminals 20 may be general-purpose personal computers (PCs), tablet terminals, mobile phones such as smartphones, or wearable devices such as head mounted displays (HMDs) or headsets. Note that the example in which the terminals 20 are game consoles will be mainly described below.

Figure 2:
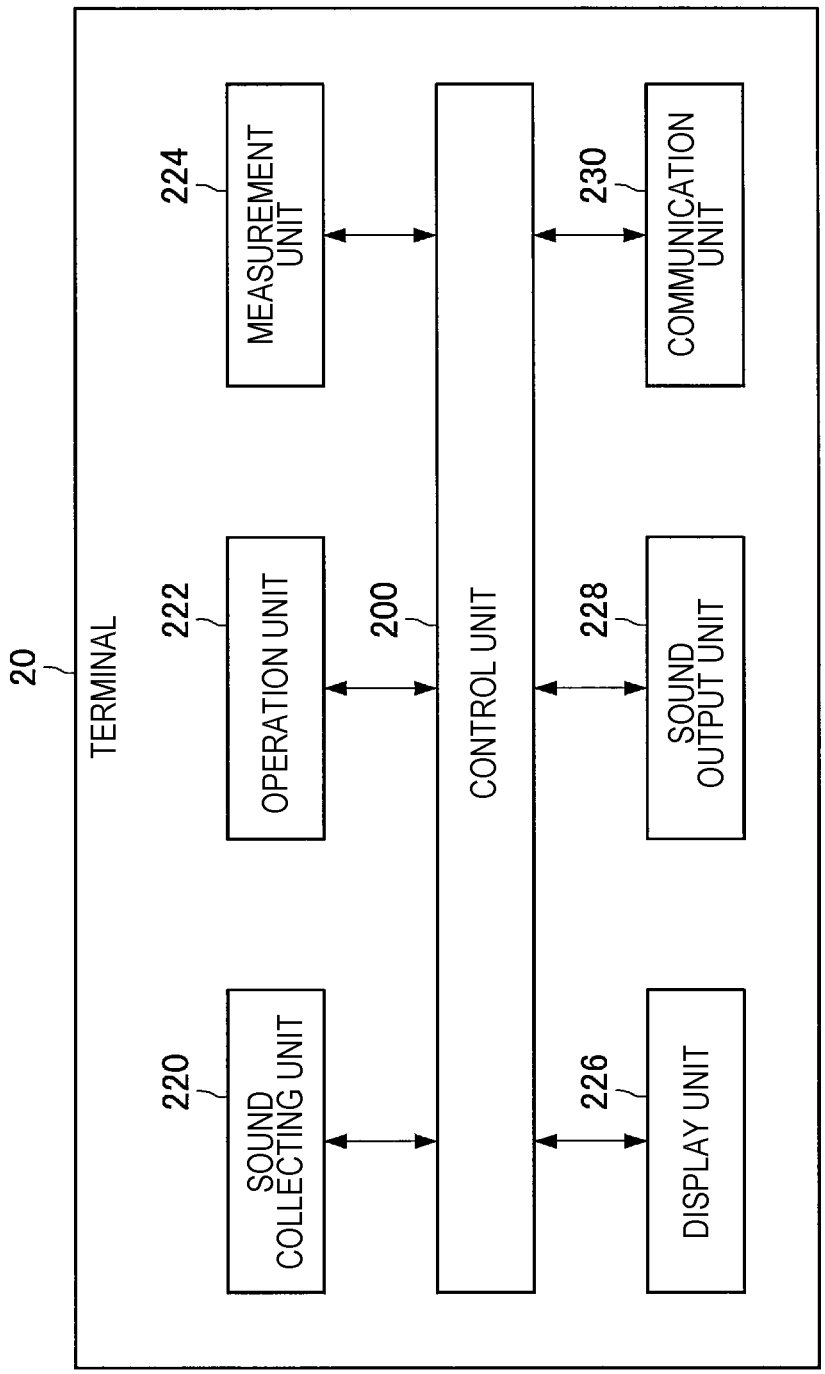
FIG. 2 is a functional block diagram illustrating a configuration example of a terminal 20 according to a first embodiment.

Here, an example of a functional configuration of each terminal 20 will be described with reference to FIG. 2. As illustrated in FIG. 2, the terminal 20 has, for example, a control unit 200, a sound collecting unit 220, an operation unit 222, a measurement unit 224, a display unit 226, a sound output unit 228, and a communication unit 230.

The control unit 200 controls overall operations of the terminal 20 by using hardware such as a central processing unit (CPU) and a random access memory (RAM), for example.

The sound collecting unit 220 collects external sound. In addition, the sound collecting unit 220 delivers the collected sound to the control unit 200.

The operation unit 222 receives a user's inputs. In addition, the operation unit 222 delivers received content to the control unit 200.

The measurement unit 224 includes various sensors such as a camera, a sweat sensor, and a temperature sensor, for example. The measurement unit 224 performs measurement in relation to a user's state, for example. In addition, the measurement unit 224 delivers a measurement result to the control unit 200.

The display unit 226 is an example of an output unit according to the present disclosure. The display unit 226 displays a display screen under control performed by the control unit 200.

The sound output unit 228 is an example of the output unit according to the present disclosure. The sound output unit 228 outputs sound under control performed by the control unit 200.

The communication unit 230 transmits and receives information to and from another apparatus via the communication network 30, for example. For example, the communication unit 230 transmits the sound collected by the sound collecting unit 220 to the server 10 under control performed by the control unit 200. In addition, the communication unit 230 receives messages and the like input by another user from the server 10.

Note that the configuration of the terminal 20 is not limited to the aforementioned example. For example, any one or more of the sound collecting unit 220, the operation unit 222, the measurement unit 224, the display unit 226, and the sound output unit 228 may be provided outside the terminal 20.

<1-2. Server 10>

The server 10 is an example of the information processing apparatus according to the present disclosure. The server 10 controls exchange of input messages between the terminals 20. For example, the server 10 can deliver the sound input by the sound chatting user 2a without any change to the terminal 20b that the text chatting user 2b uses or can deliver a result of performing sound recognition on the input sound to the terminal 20*b*. In addition, the server 10 converts text input by the text chatting user 2*b* into sound by using TextToSpeech (TTS) and then delivers the sound into which it is converted to the terminal 20*a* that the sound chatting user 2*a* uses. In this manner, the sound chatting user 2*a* and the text chatting user 2*b* can perform chatting with a feeling similar to that in a case in which the users use the same chatting method.

{1-2-1. Flow of Message Exchanging Processing}

Figure 3:
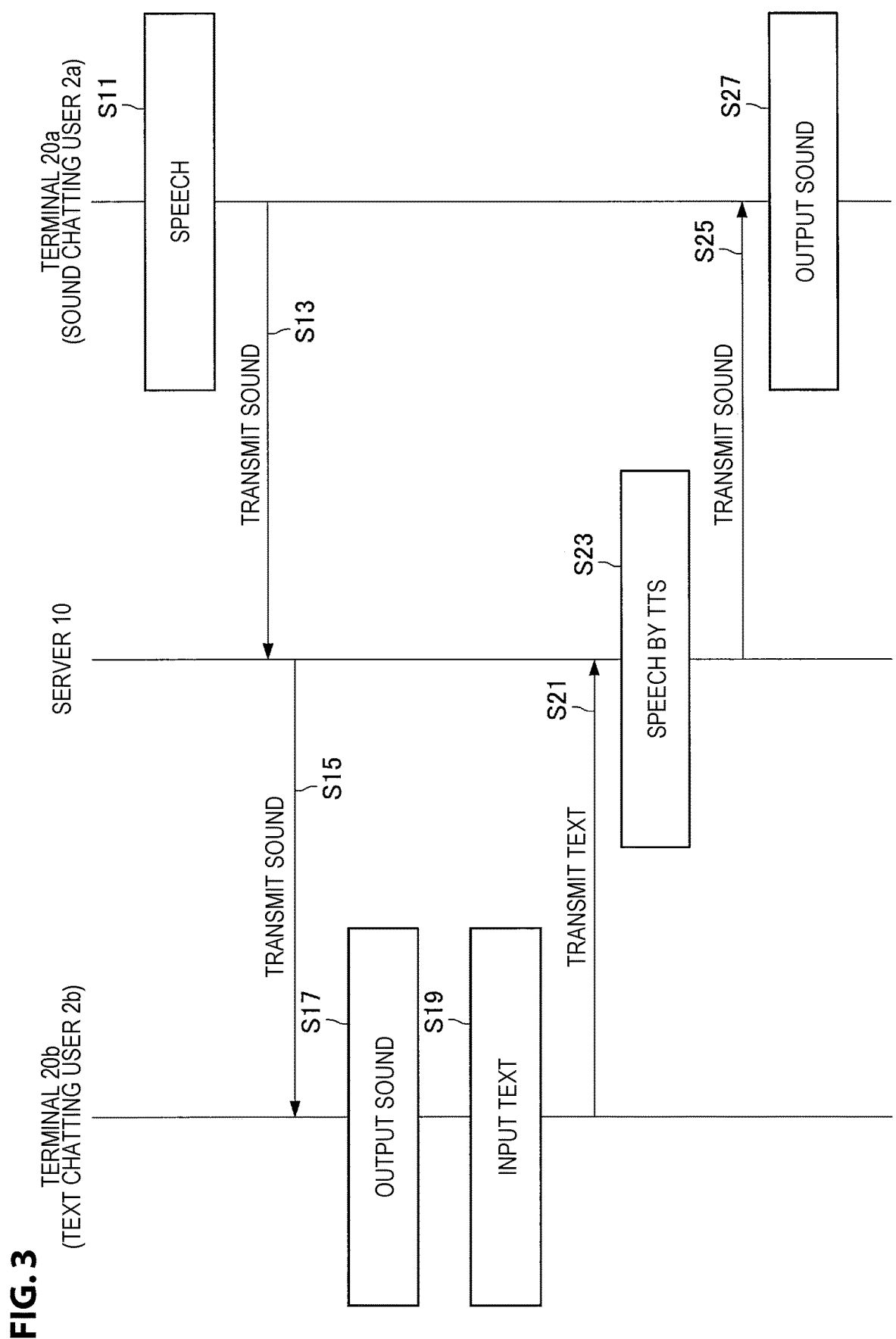
FIG. 3 is a sequence diagram illustrating a flow of message exchanging processing according to the first embodiment.

Here, a flow of message exchanging processing between the sound chatting user 2*a* and the text chatting user 2*b* will be specifically described with reference to FIG. 3. As illustrated in FIG. 3, the sound chatting user 2*a* performs speech first (S11). Then, the terminal 20*a* that the sound chatting user 2*a* uses collects sound of the speech and then transmits the collected sound to the server 10 (S13).

Thereafter, the server 10 transmits the received sound to the terminal 20*b* that the text chatting user 2*b* uses (S15).

Thereafter, the sound output unit 228*b* of the terminal 20*b* outputs the received sound (S17). Thereafter, the text chatting user 2*b* inputs text by using the operation unit 222, for example (S19). Then, once the input is completed, the terminal 20*b* transmits the input text to the server 10 (S21).

Thereafter, the server 10 converts the received text into sound by the TTS function (S23). Then, the server 10 transmits the converted sound to the terminal 20*a* (S25).

Thereafter, the sound output unit 228*a* of the terminal 20*a* outputs the received sound (S27).

<1-3. Communication Network 30>

The communication network 30 is a wired or wireless transmission path of information that is transmitted from an apparatus connected to the communication network 30. For example, the communication network 30 may include public line networks such as a telephone line network, the Internet, and a satellite communication network, various local area networks (LANs) including Ethernet (registered trademark), a wide area network (WAN), and the like. In addition, the communication network 30 may include dedicated line networks such as an Internet protocol-virtual private network (IP-VPN).

<1-4. Organizing of Problems>

The configuration of the information processing system shared by the respective embodiments has been described above. Incidentally, it generally takes a longer time to input a message in the text chatting than in the sound chatting. Therefore, a time during which the sound chatting user waits for a reply from the text chatting user becomes long and can feel uncomfortable in the chatting between the sound chatting user and the text chatting user. Thus, it is desirable that the text chatting user can know information about the length of a time that the sound chatting user allows for waiting for a reply from the text chatting user, for example.

Thus, the server 10 according to the first embodiment has been contrived by considering the aforementioned circumstances as one viewpoint. According to the first embodiment, the server 10 can control an output of information indicating a waiting status of the sound chatting user in relation to a reply from the text chatting user (hereinafter referred to as information indicating a waiting status of the sound chatting user) on the basis of the detection of the speech of the sound chatting user as will be described later. In this manner, the text chatting user can ascertain the waiting status of the sound chatting user at the time of the input of the message.

2. First Embodiment

<2-1. Configuration>

Figure 4:
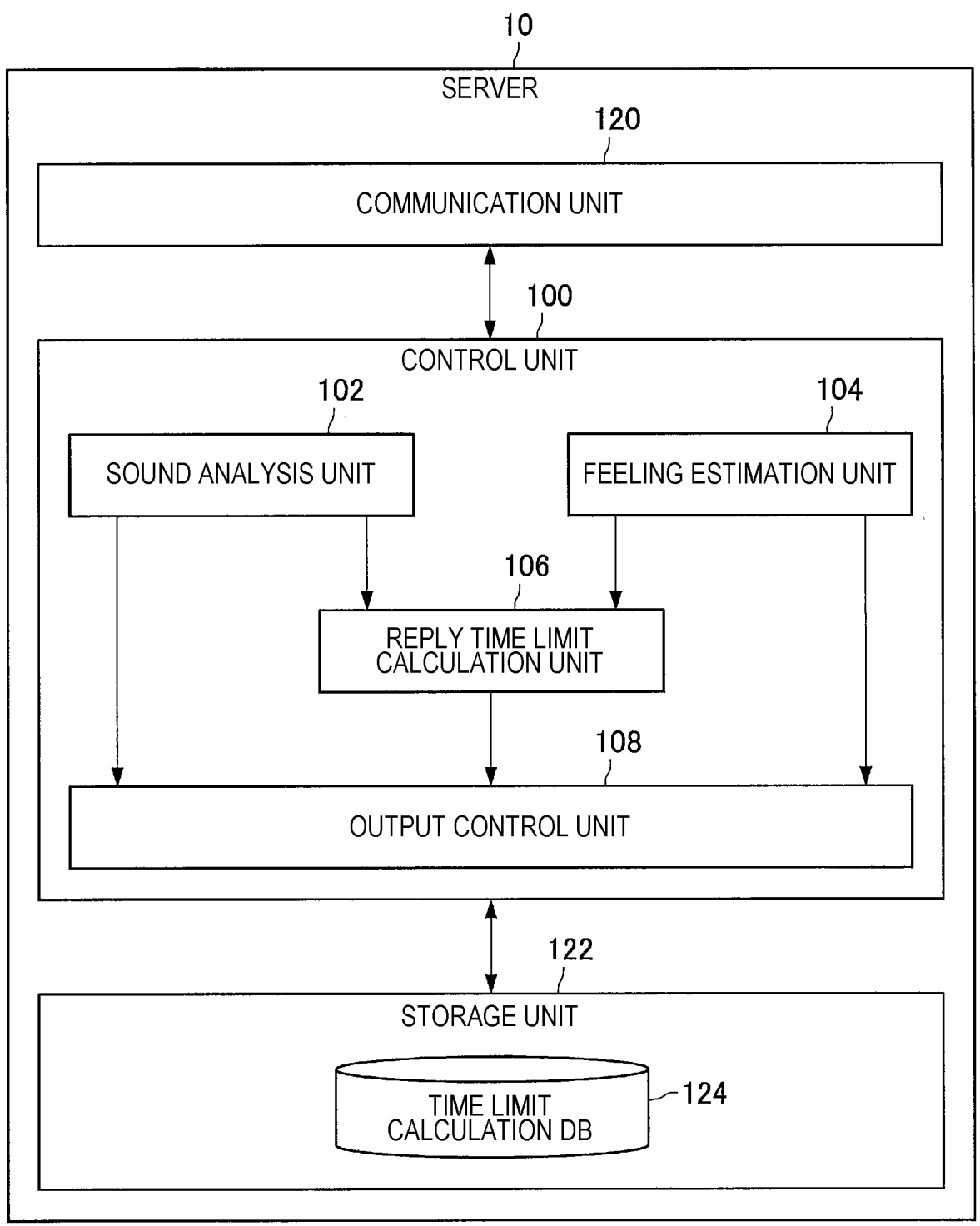
FIG. 4 is a functional block diagram illustrating a configuration example of a server 10 according to the first embodiment.

Next, a first embodiment will be described. First, a configuration of the server 10 according to the first embodiment will be described in detail. FIG. 4 is a functional block diagram illustrating a configuration example of the server 10 according to the first embodiment. As illustrated in FIG. 4, the server 10 has a control unit 100, a communication unit 120, and a storage unit 122.

{2-1-1. Control Unit 100}

The control unit 100 controls overall operations of the server 10 by using hardware such as a CPU 150 and a RAM 154 that are incorporated in the server 10 and will be described later. In addition, the control unit 100 has a sound analysis unit 102, a feeling estimation unit 104, a reply time limit calculation unit 106, and an output control unit 108 as illustrated in FIG. 4.

{2-1-2. Sound Analysis Unit 102}

(2-1-2-1. Analysis of Speech Properties)

The sound analysis unit 102 analyzes sound received from the terminals 20. For example, the sound analysis unit 102 analyzes speech properties of the received sound. Here, the speech properties are a sound volume of the voice, a speaking speed, a pitch, and the like, for example.

(2-1-2-2. Sound Recognition)

In addition, the sound analysis unit 102 performs sound recognition and syntactic analysis on the received sound. For example, the sound analysis unit 102 performs sound recognition on the received sound and then performs modality analysis of a speech sentence on the basis of the result of the recognition. Here, the modality analysis is analysis of linguistic type (for example, "negative," "exclamatory," "solicitation," "question," and the like) of the sentence.

In addition, the sound analysis unit 102 determines whether or not the modality of the sentence of the speech is a modality that requires a response, on the basis of the result of the modality analysis. In a case in which the modality type analyzed by the modality analysis is "condition," "inquiry," "encouragement," or "solicitation," for example, the sound analysis unit 102 determines that the modality is a modality that requires a response. In addition, in a case in which the analyzed modality type is not one of the aforementioned modalities, the sound analysis unit 102 determines that the modality is a modality that does not require a response.

{2-1-3. Feeling Estimation Unit 104}

The feeling estimation unit 104 estimates feelings of the users who are using the terminals 20 on the basis of various sensing results received from the terminals 20. For example, the feeling estimation unit 104 estimates the feelings of the users (for example, angry, sad, having fun, or the like) by analyzing facial expressions on the basis of captured face images of the users. In addition, the feeling estimation unit 104 can also estimate the feelings of the users by analyzing the received sound.

{2-1-4. Reply Time Limit Calculation Unit 106}

The reply time limit calculation unit 106 calculates a message reply time limit in relation to the text chatting user on the basis of a predetermined reference. Here, the reply time limit corresponds to a maximum time the sound chatting user is estimated to allow for waiting (or that the user does not feel uncomfortable waiting) for a reply from the text chatting user, for example. In addition, the predetermined reference can include the detected speech properties of the sound chatting user. In addition, the predetermined reference can include a result of feeling estimation performed by the feeling estimation unit 104 on the basis of the received sound (of the sound chatting user). In addition, the predetermined reference can include a sensing result in relation to the state of the sound chatting user. In addition, the predetermined reference can include a result of the sound recognition performed by the sound analysis unit 102 on the received sound (of the sound chatting user).

For example, the reply time limit calculation unit 106 calculates the reply time limit on the basis of the result of the analysis performed by the sound analysis unit 102, the result of the estimation performed by the feeling estimation unit 104, and content registered in a time limit calculation DB 124, which will be described later. In one example, the reply time limit calculation unit 106 calculates a reduction rate from a reference time on the basis of the respective reduction coefficients stored in the time limit calculation DB 124 first. Then, the reply time limit calculation unit 106 calculates the reply time limit by multiplying the reference time by the calculated reduction rate. Here, the length of the reference time can be set in advance for each of the types of the terminals 20, and the types of services (a chatting service and the like). Then, the reply time limit calculation unit 106 calculates the reply time limit by multiplying the reference time associated with the types of the terminals 20 that the users are using or the type of the service that the users are using by the calculated reduction rate.

(2-1-4-1. Time Limit Calculation DB 124)

Figure 5:
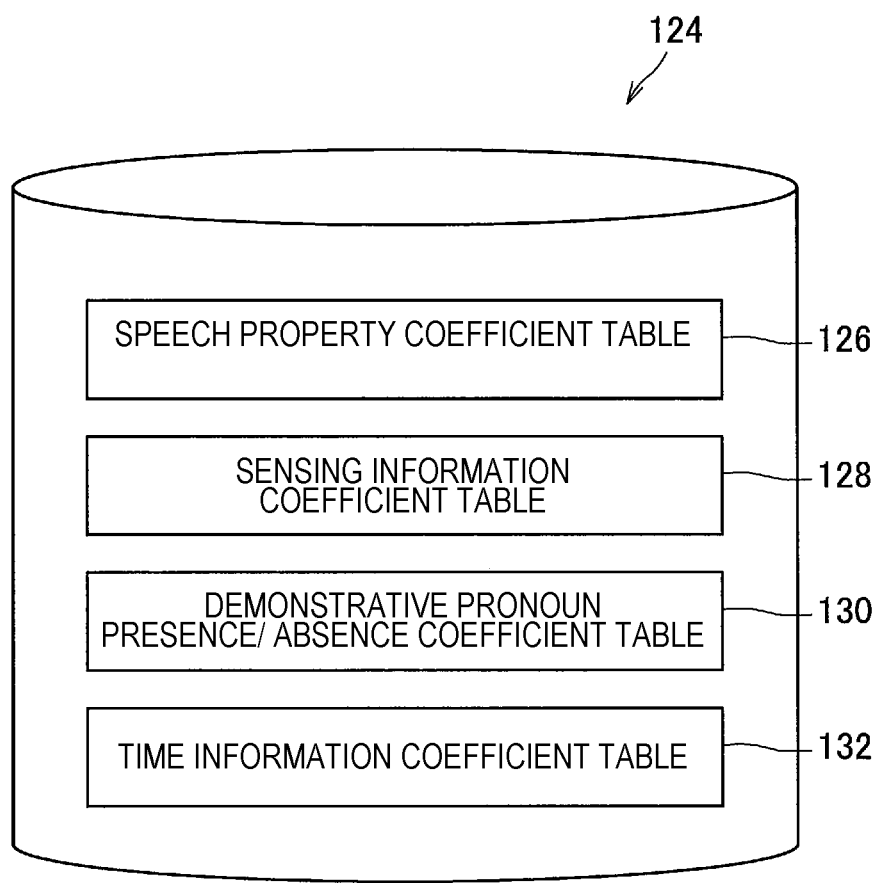
FIG. 5 is an explanatory diagram illustrating a configuration example of a time limit calculation DB 124 according to the first embodiment.

The time limit calculation DB 124 is a database in which reduction coefficients used to calculate the reply time limit are stored. The time limit calculation DB 124 can be stored in the storage unit 122, for example. FIG. 5 is an explanatory diagram illustrating a configuration example of the time limit calculation DB 124. As illustrated in FIG. 5, the time limit calculation DB 124 includes a speech property coefficient table 126, a sensing information coefficient table 128, a demonstrative pronoun presence/absence coefficient table 130, and a time information coefficient table 132.

FIG. 6 is an explanatory diagram illustrating a configuration example of the speech property coefficient table 126. As illustrated in FIG. 6, a sound volume and a speaking speed of speech and a reduction coefficient 1260 are associated with each other, for example, in the speech property coefficient table 126. In the example illustrated in FIG. 6, a reduction coefficient in a case in which the sound volume of the speech is "ordinary" and the speaking speed is "higher than ordinary" is "0.8." Note that in the speech property coefficient table 126, what is associated is not limited to the sound volume and the speaking speed of the speech, and for example, a pitch of the speech, a result of estimating a feeling on the basis of sound of the speech, and the like may be additionally or alternatively associated.

FIG. 7 is an explanatory diagram illustrating a configuration example of the sensing information coefficient table 128. As illustrated in FIG. 7, a result of feeling estimation based on sensing information (face images and the like) other than sound, a result of sensing the amount of sweat, and a reduction coefficient 1280, for example, are associated with each other in the sensing information coefficient table 128. In the example illustrated in FIG. 7, the reduction coefficient in a case in which the result of feeling estimation is "angry" and the amount of sweat is "more than ordinary" is "0.5." Note that what is associated is not limited to the result of feeling estimation and the amount of sweat, and for example, a result of detecting a line of sight (whether or not the user is viewing the display unit 226 or the like), a result of detection performed by the operation unit 222 (whether or not the user is gripping the operation unit 222, whether or not fingers are in contact with the operation unit 222, or the like), a result of action recognition (a game playing status and the like), or the like may be additionally or alternatively associated in the sensing information coefficient table 128.

Figure 8:
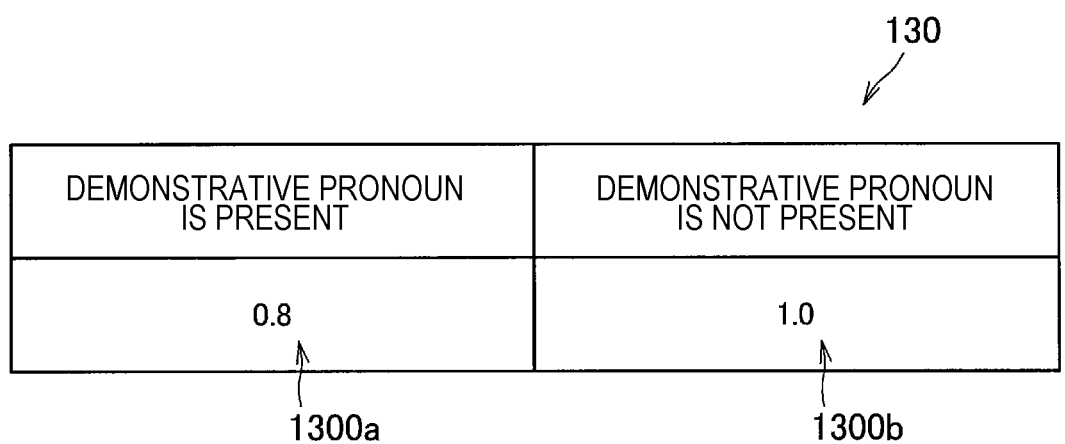
FIG. 8 is an explanatory diagram illustrating a configuration example of a demonstrative pronoun presence/absence coefficient table 130 according to the first embodiment.

FIG. 8 is an explanatory diagram illustrating a configuration example of the demonstrative pronoun presence/absence coefficient table 130. As illustrated in FIG. 8, presence/absence of a demonstrative pronoun and a reduction coefficient 13300 are associated in the demonstrative pronoun presence/absence coefficient table 130. In the example illustrated in FIG. 8, a reduction coefficient in a case in which a demonstrative pronoun is "present" in a result of performing sound recognition on the received sound is "0.8."

Figure 9:
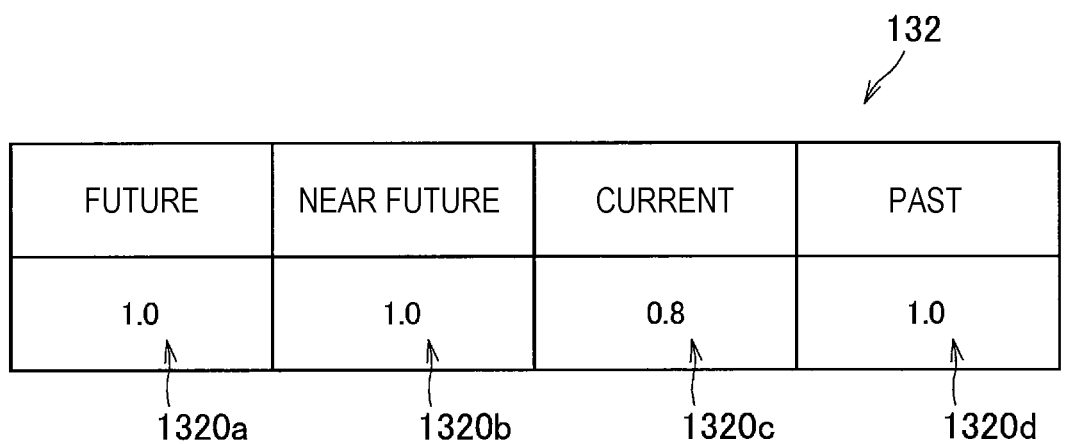
FIG. 9 is an explanatory diagram illustrating a configuration example of a time information coefficient table 132 according to the first embodiment.

FIG. 9 is an explanatory diagram illustrating a configuration example of the time information coefficient table 132. As illustrated in FIG. 9, a point indicated by a word included in a result of sound recognition and a reduction coefficient 1320 are associated with each other in the time information coefficient table 132. In the example illustrated in FIG. 9, a reduction coefficient in a case in which a word indicating "current" is present in the result of the sound recognition of the sound is "0.8". Note that the individual values of the reduction coefficients illustrated in FIGS. 6 to 9 are just examples, the values are not limited to such examples, and arbitrary values can be registered.

(2-14-2. Example of Calculating Time Limit)

Here, an example in which the reply time limit calculation unit 106 calculates a message reply time limit on the basis of the various tables illustrated in FIGS. 6 to 9 will be described. For example, it is assumed that the reference time is "30 seconds," the reduction coefficient decided from the speech property coefficient table 126 is "0.8," the reduction coefficient decided form the sensing information coefficient table 128 is "1.0," the reduction coefficient decided from the demonstrative pronoun presence/absence coefficient table 130 is "0.8," and the reduction coefficient decided from the time information coefficient table 132 is "1.0." In this case, the reply time limit calculation unit 106 calculates the reply time limit as "19 seconds" by multiplying the reference time by all the aforementioned reduction coefficients (30 (seconds)×0.8×1.0×0.8×1.0≈19 (seconds)).

{2-1-5. Output Control Unit 108}

(2-1-5-1. Start and End of Output of Information Indicating Waiting Status)

The output control unit 108 controls an output of the information indicating the waiting status of the sound chatting user on the basis of detection of speech of the sound chatting user. For example, the output control unit 108 controls an output of the information indicating the waiting status of the sound chatting user on the basis of a result of analyzing the detected speech by the sound analysis unit 102. In one example, the output control unit 108 causes the output of the information indicating the waiting status of the sound chatting user to start on the basis of a result of determining whether or not the sentence of the detected speech has a modality that requires a response. In a case in which it is determined by the sound analysis unit 102 that the sentence of the detected speech has a modality that requires a response, for example, the output control unit 108 causes the output of the information indicating the waiting status of the sound chatting user to start. In addition, in a case in which it is determined by the sound analysis unit 102 that the sentence of the detected speech has a modality that does not require a response, the output control unit 108 does not cause the output of the information indicating the waiting status of the sound chatting user to start.

In addition, after the output of the information indicating the waiting status of the sound chatting user is started, the output control unit 108 causes the output of the information indicating the waiting status of the sound chatting user to end on the basis of a predetermined condition. In a case in which an input of a message by the text chatting user has been completed, for example, the output control unit 108 causes the output of the information indicating the waiting status of the sound chatting user to end. In addition, when an elapse time from the time of the output of the information indicating the waiting status of the sound chatting user exceeds a predetermined upper limit time, the output control unit 108 causes the output of the information indicating the waiting status of the sound chatting user to end. Here, the predetermined upper limit time may be a time set in advance, may be a time obtained by adding a predetermined time to the reply time limit calculated by the reply time limit calculation unit 106, or may be the same as the reply time limit.

(2-1-5-2. Presentation Through GUI)

Here, an example of the output of the information indicating the waiting status of the sound chatting user will be described in more detail. For example, the output control unit 108 causes a display unit 226 on the side of the text chatting user to display an indicator including the reply time limit calculated by the reply time limit calculation unit 106 as the information indicating the waiting status of the sound chatting user.

Figure 10:
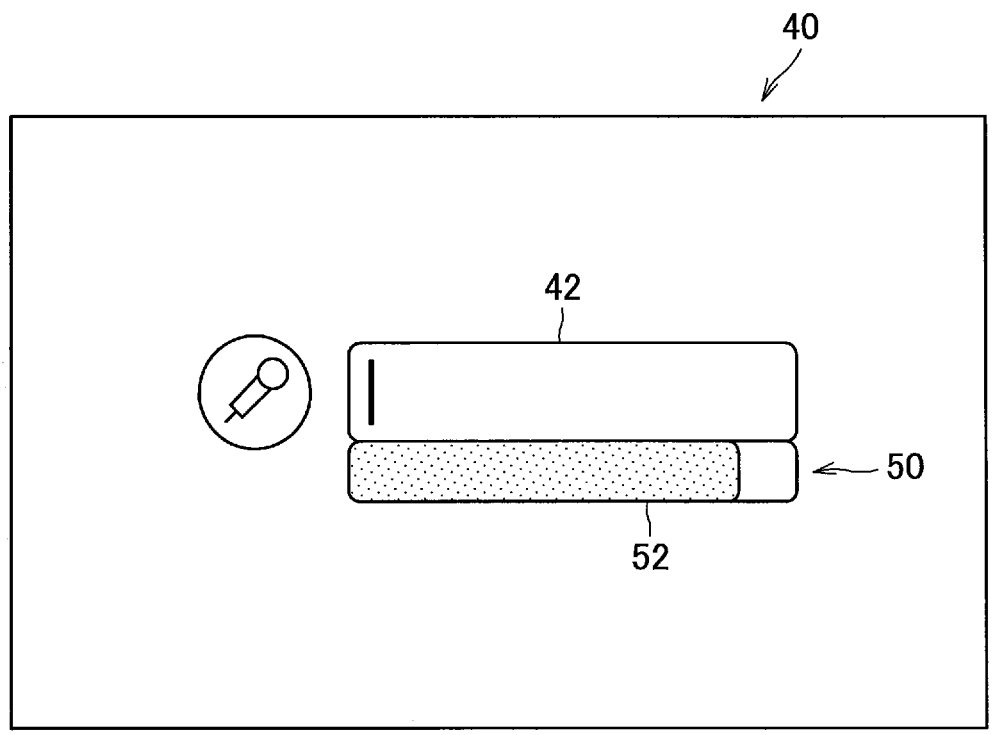
FIG. 10 is an explanatory diagram illustrating a display example of an indicator according to the first embodiment.

FIG. 10 is an explanatory diagram illustrating a display example (display screen 40) of an indicator. As illustrated in FIG. 10, for example, the output control unit 108 causes a text input section 42 and an indicator 50 to be displayed together in the display screen 40. Here, the text input section 42 is an input section for the text chatting user to input text (message). In addition, the indicator 50 includes a meter 52 as illustrated in FIG. 10. The meter 52 is display that indicates a difference between the reply time limit and an elapsed time from the time when the display of the indicator 50 is started (hereinafter, referred to as a remaining time in some cases). According to the display example, the text chatting user can know a remaining time that the sound chatting user allows for waiting for a reply of the message. As a result, the text chatting user can determine whether or not the user has to rush to input a reply message, for example, at any time.

In addition, the right end of the indicator 50 in FIG. 10 indicates the length of the reply time limit calculated by the reply time limit calculation unit 106. In a case in which the length of the reply time limit is "2 minutes", for example, the length of the indicator 50 becomes twice as long as that in a case in which the length of the reply time limit is "1 minute". In addition, the right end of the meter 52 and the right end of the indicator 50 can coincide with each other when the display of the indicator 50 is started. Alternatively, the length of the indicator 50 may be fixed regardless of the length of the reply time limit, and a speed at which the length of the meter 52 changes may be caused to change in accordance with a reply control time as will be described later. In the case in which the length of the reply time limit is "2 minutes", for example, the output control unit 108 may shorten the length of the meter 52 at a speed that is "twice" as high as that in the case in which the length of the reply time limit is "1 minute".

However, the embodiment is not limited to such an example, and the right end of the indicator 50 may be set at a predetermined time (for example, 3 minutes or the like). Then, in a case in which the reply time limit is less than a predetermined time in this case, the meter 52 is displayed such that the meter 52 is shorter than the indicator 50 when the display of the indicator 50 is started.

Display Control in Accordance with Elapse of Time

In addition, the output control unit 108 can cause a display mode of the indicator to change in accordance with elapse of a time from the time when the display of the indicator is started. FIG. 11 is an explanatory diagram illustrating an example in which the display of the indicator 50 is changed in accordance with elapse of a time. Note that FIG. 11 illustrates display examples of the indicator 50 when a longer time has elapsed in the order of (a), (b), (c), and (d). As illustrated in FIG. 11, the output control unit 108 shortens the length of the meter 52 as the elapse time from the time when the display of the indicator 50 is started is longer (that is, as the remaining time is shorter). Further, the output control unit 108 may cause a display color of the meter 52 to change in accordance with a proportion of the length of the remaining time with respect to the reply time limit, for example, as illustrated in FIG. 11. In a case in which a proportion of the remaining time with respect to the reply time limit is less than "50%" as illustrated in (b) of FIG. 11, the outputting control unit 108 causes the display color of the meter 52 to change into a display color indicating "Caution". In addition, in a case in which the proportion of the remaining time with respect to the reply time limit is less than "30%" as illustrated in (c) of FIG. 11, the output control unit 108 causes the display color of the meter 52 to change into a display color indicating "Warning". According to these display examples, it is possible to represent the fact that the remaining time until the reply time limit is short to the text chatting user in an emphasized manner.

Note that (d) of FIG. 11 illustrates a display example of the indicator 50 after the text chatting user transmits a message. As illustrated in (d) of FIG. 11, the output control unit 108 causes only the meter 52 not to be displayed or causes the indicator 50 not to be displayed, for example, after the message is transmitted. Note that although the aforementioned description has been given on the assumption that the indicator 50 and the meter 52 are different, the indicator 50 and the meter 52 are not limited to such an example and may be the same.

Auxiliary Display

Further, the output control unit 108 may cause auxiliary display 54 to be displayed in the vicinity of (for example, on the right side next to) the indicator 50 as illustrated in FIG. 11. Here, the auxiliary display 54 is an example of the information indicating the waiting status of the sound chatting user.

For example, a proportion of the remaining time with respect to the reply time limit and text (for example, "OK", "Hurry up!", "He is angry!!!", or the like) can be registered in advance in an associated manner in a table. Then, the output control unit 108 may successively update the type of the text displayed as the auxiliary display 54 in accordance with the proportion of the current remaining time and content registered in the table.

Alternatively, the output control unit 108 may cause a result of estimating a feeling by the feeling estimation unit 104 to be displayed as the auxiliary display 54. In a case in which it is estimated by the feeling estimation unit 104 that the sound chatting user is angry when the speech of the sound chatting user is detected, for example, the output control unit 108 may cause text "He is angry!!!" to be displayed as the auxiliary display 54 (regardless of the elapse time). Further, in a case in which it is possible to estimate a feeling of the sound chatting user in real time, the output control unit 108 may successively update display content of the auxiliary display 43 every time the result of estimating the feeling changes.

Alternatively, the output control unit 108 may cause a sensing result in relation to a state of the sound chatting user (for example, whether or not the user is viewing the display unit 226, whether or not the user is gripping the operation unit 222, or the like) to be displayed as the auxiliary display 54. Note that although FIG. 11 illustrates the example in which text is displayed as the auxiliary display 54, the auxiliary display 54 is not limited to such an example, and for example, an image such as an icon may be displayed.

Display Example when Time Limit is Exceeded

In addition, FIG. 12 is an explanatory diagram illustrating a display example of the indicator in a case in which an elapse time from the time when the display of the indicator is started exceeds the reply time limit. As illustrated in (a) of FIG. 12, the output control unit 108 may blink the text input section 42 when the elapse time exceeds the reply time limit. Alternatively, the output control unit 108 may cause an on-screen keyboard (OSK) 60 to be displayed in the display screen while causing the text input section 42 to be blinked as illustrated in (b) of FIG. 12. In this manner, it is possible to force the text chatting user to input text.

(2-1-5-3. Presentation Through Sound)

Alternatively, the output control unit 108 can also cause the sound output unit 228 of the terminal 20 that the text chatting user uses to output sound indicating the waiting status of the sound chatting user. When the speech of the sound chatting user is detected, for example, the output control unit 108 may cause the sound output unit 228 to output sound reading the reply time limit calculated by the reply time limit calculation unit 106.

Alternatively, the length of a time (or the proportion of the remaining time) and the type of sound can be registered in advance in an associated manner in a table. Then, when speech of the sound chatting user is detected, the output control unit 108 may cause the sound output unit 228 to output the type of sound in accordance with the length of the reply time limit calculated by the reply time limit calculation unit 106 (or "100%") and the content registered in the table. Further, the output control unit 108 may successively update the type of the sound to be output in accordance with the length of the current remaining time (or the proportion of the remaining time) and the content registered in the table. In this manner, the text chatting user can know how much the remaining time is left.

Alternatively, the length of a time (or the proportion of the remaining time) and the length of time intervals at which predetermined sound (for example, bell sound, beep sound, or the like) is output can be registered in advance in an associated manner in a table. For example, the registration can be performed such that the time interval of the output sound becomes shorter as the length of the remaining time (or the proportion of the remaining time) is shorter. Then, when the speech of the sound chatting user is detected, the output control unit 108 may cause the sound output unit 228 to output predetermined sound at time intervals that are registered in the table in associated with the length of the reply time limit calculated by the reply time limit calculation unit 106 (or "100%"). Further, the output control unit 108 may successively update the time interval at which the sound is output in accordance with the length of the current remaining time (or the proportion of the remaining time) and content registered in the table. In this manner, the text chatting user can know how much the remaining time is.

Note that when an elapse time from the time when the sound indicating the waiting status is output exceeds the reply time limit, the output control unit 108 may cause the text input section 42 displayed in the display screen to be blinked as illustrated in FIG. 12, for example.

(2-1-5-4. Presentation Through Vibration)

Alternatively, the output control unit 108 can cause the operation unit 222 of the terminal 20 that the text chatting user uses, for example, to output vibration indicating the waiting status of the sound chatting user.

For example, the length of a time (or the proportion of the remaining time) and the type of vibration can be registered in advance in associated manner in the table. In one example, a vibration pattern that has been evaluated as being more comfortable as the length of the time (or the proportion of the remaining time) is longer may be registered in the table. Then, when the speech of the sound chatting user is detected, the output control unit 108 may cause the operation unit 222 to output a type of vibration in accordance with the length of the reply time limit calculated by the reply time limit calculation unit 106 (or "100%") and the content registered in the table. Further, the output control unit 108 may successively update the type of the vibration to be output in accordance with the length of the current remaining time (or the proportion of the remaining time) and the content registered in the table.

Alternatively, the length of a time (or the proportion of the remaining time) and the length of time intervals at which a predetermined type of vibration is output can be registered in advance in an associated manner in the table. For example, the registration can be performed such that the time intervals of the output vibration become shorter as the length of the remaining time (or the proportion of the remaining time) is shorter. Then, when the speech of the sound chatting user is detected, the output control unit 108 may cause the operation unit 222 to output predetermined vibration at the time intervals registered in the table in association with the length of the reply time limit calculated by the reply time limit calculation unit 106 (or "100%"). Further, the output control unit 108 may successively update the time intervals at which the vibration is output in accordance with the length of the current remaining time (or the proportion of the remaining time) and the content registered in the table.

Alternatively, the proportion of the remaining time (or the length of the time) and a site, from which vibration is output, of the operation unit 222 can be registered in advance in an associated manner in the table. For example, the registration can be performed such that the site from which the vibration is output further increases as the proportion of the remaining time is smaller. Then, the output control unit 108 may successively cause the site from which the vibration is output to change in accordance with the proportion of the current remaining time (or the length of the remaining time) and the content registered in the table.

Note that when an elapse time from the time when the vibration indicating the waiting status is output exceeds the reply time limit, the output control unit 108 may cause the text input section 42 displayed in the display screen to blink as illustrated in FIG. 12, for example.

(2-1-5-5. Increase or Decrease of Remaining Time)

Note that the output control unit 108 can also increase or decrease the remaining time (in relation to the reply of the text chatting user) on the basis of a predetermined condition. Further, when the output control unit 108 increases or decreases the remaining time, the output control unit 108 causes the indicator to be displayed, causes the sound to be output, or causes vibration to be output in a form in accordance with the remaining time after increasing or decreasing.

For example, the output control unit 108 may add a predetermined time to a current remaining time every time new speech of the sound chatting user is detected, before the text chatting user sends a reply.

Alternatively, before the text chatting user sends a reply and when it is detected that sound chatting user has performed new speech, the output control unit 108 may increase or decrease the current remaining time in accordance with the new speech. When it is detected that the sound chatting user has performed new speech including such a keyword that urges the counterpart to reply a message, such as "Rely me soon!", the output control unit 108 may shorten the remaining time by a predetermined time.

Alternatively, before the text chatting user sends a reply and when a result of estimating a feeling by the feeling estimation unit 104 has changed, the output control unit 108 may increase or decrease the remaining time in accordance with a change in the result of estimating the feeling. When the result of estimating the feeling when the speech is detected is "ordinary" and when the result of estimating the feeling of the sound chatting user has changed to "angry" before the text chatting user sends a reply, for example, the output control unit 108 may shorten the remaining time by a predetermined time. In addition, when the result of estimating the feeling when the speech is detected is "angry" and when the result of estimating the feeling of the sound chatting user has changed to "ordinary" before the text chatting user sends a reply, the output control unit 108 may add a predetermined time to the current remaining time.

Modification Example

Note that the output control unit 108 can increase or decrease the remaining time with respect to any text chatting user in a situation in which messages are exchanged between three or more users in a modification example. For example, the output control unit 108 may change the amount of increase or decrease in the remaining time in relation to the reply of the message for each text chatting user on the basis of a predetermined condition in a situation in which one sound chatting user is present and a plurality of text chatting users are present.

An application example in a situation in which a sound chatting user is a teacher and text chatting users are students will be described as an example. For example, it is assumed that the teacher performs speech for questioning "Is there anyone who knows oo?" in class and some (hereinafter, referred to as a student A) of the plurality of students replies a message to the speech. In this case, the output control unit 108 may set the remaining time for the student A to "0 seconds" and add a predetermined time to the current remaining time in relation to all the students other than the student A. According to the control example, it is possible to give a time for examining or considering the question in more detail in relation to the question to the students except for the student A, for example. In addition, it is possible to activate the class by encouraging a plurality of students to answer the same question.

In addition, an application example in a situation in which a teacher (sound chatting user) who is at a remote location and a plurality of students (text chatting users) are taking an English group lesson, and movies of the plurality of students are being displayed on a display unit of the terminal 20 (PC or the like) that the teacher uses will be described as another example. For example, it is assumed that which of the movies of the plurality of students the line of sight of the teacher is directed is detected by a camera installed in the vicinity of the display unit, for example, and the teacher has performed speech for a question. In this case, the output control unit 108 may cause the remaining time of only the student corresponding to the movie, to which the line of sight of the teacher is detected to be directed, to increase. Alternatively, the output control unit 108 may cause only a display unit that the student, to which the line of sight of the teacher is detected to be directed, is viewing to display an indicator and allow only the student to input a message as a reply to the question.

{2-1-6. Communication Unit 120}

The communication unit 120 transmits and receives information to and from other devices. For example, the communication unit 120 transmits information indicating the waiting status of the sound chatting user to the terminal 20 that the text chatting user uses under control performed by the output control unit 108. In addition, the communication unit 120 receives sound of speech of the user, an input text, and the like from the terminal 20.

{2-1-7. Storage Unit 122}

The storage unit 122 stores various kinds of data and various kinds of software. For example, the storage unit 122 stores the time limit calculation DB 124 and the like.

<2-2. Operations>

The configuration according to the first embodiment has been described above. Next, an example of operations according to the first embodiment will be described with reference to FIGS. 13 to 16.

{2-2-1. Overall Flow of Operations}

First, an overall flow of operations according to the first embodiment will be described with reference to FIG. 13. Note that an example of operations performed after chatting is started between the sound chatting user and the text chatting user will be described here. In addition, an example in which the server 10 causes an indicator to be displayed as information indicating a waiting status of the sound chatting user will be described.

Figure 13:
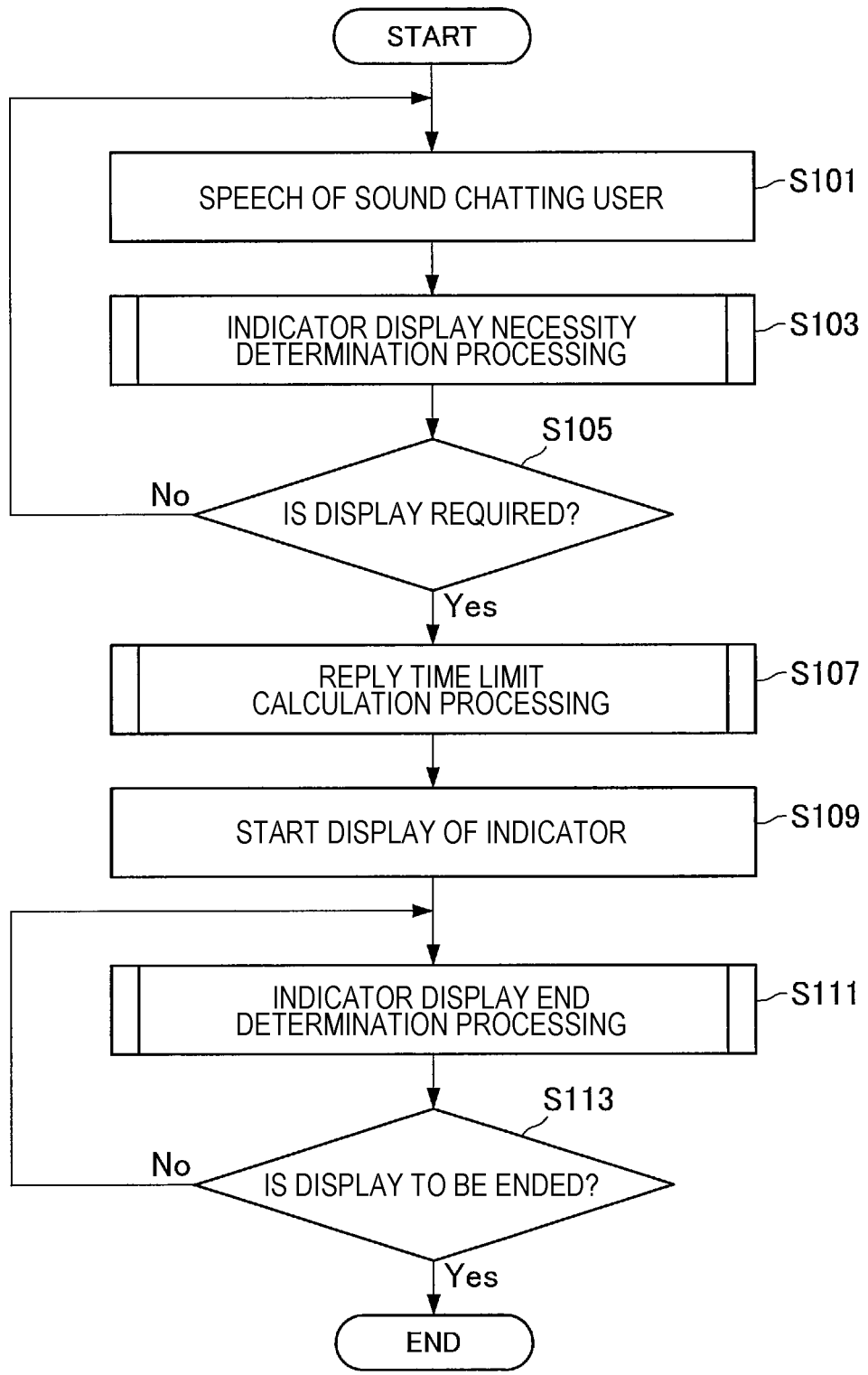
FIG. 13 is a flowchart illustrating an overall flow of operations according to the first embodiment.

As illustrated in FIG. 13, the sound chatting user performs speech first. Then, the terminal 20a that the sound chatting user uses collects sound of the speech and then successively transmits the collected sound to the server 10 (S101).

Thereafter, the server 10 performs "indicator display necessity determination processing", which will be described later (S103). Then, in a case in which it is determined not to be necessary to display the indicator (S105: No), the processing in S101 is executed again.

Meanwhile, in a case in which it is determined to be necessary to display the indicator (S105: Yes), the server 10 performs "reply time limit calculation processing", which will be described later (S107).

Then, the output control unit 108 of the server 10 causes (the display unit 226 of) the terminal 20b that the text chatting user uses to start the display of the indicator in accordance with the result of the processing in S107 (S109).

Thereafter, the server 10 performs "indicator display end determination processing", which will be described later (Sill). Then, in a case in which it is determined not to end the display of the indicator (S113: No), the server 10 waits for a predetermined time, for example, and then performs the processing in S111 again. Meanwhile, in a case in which it is determined to end the display of the indicator (S113: Yes), the operations end.

{2-2-2. Indicator Display Necessity Determination Processing}

Figure 14:
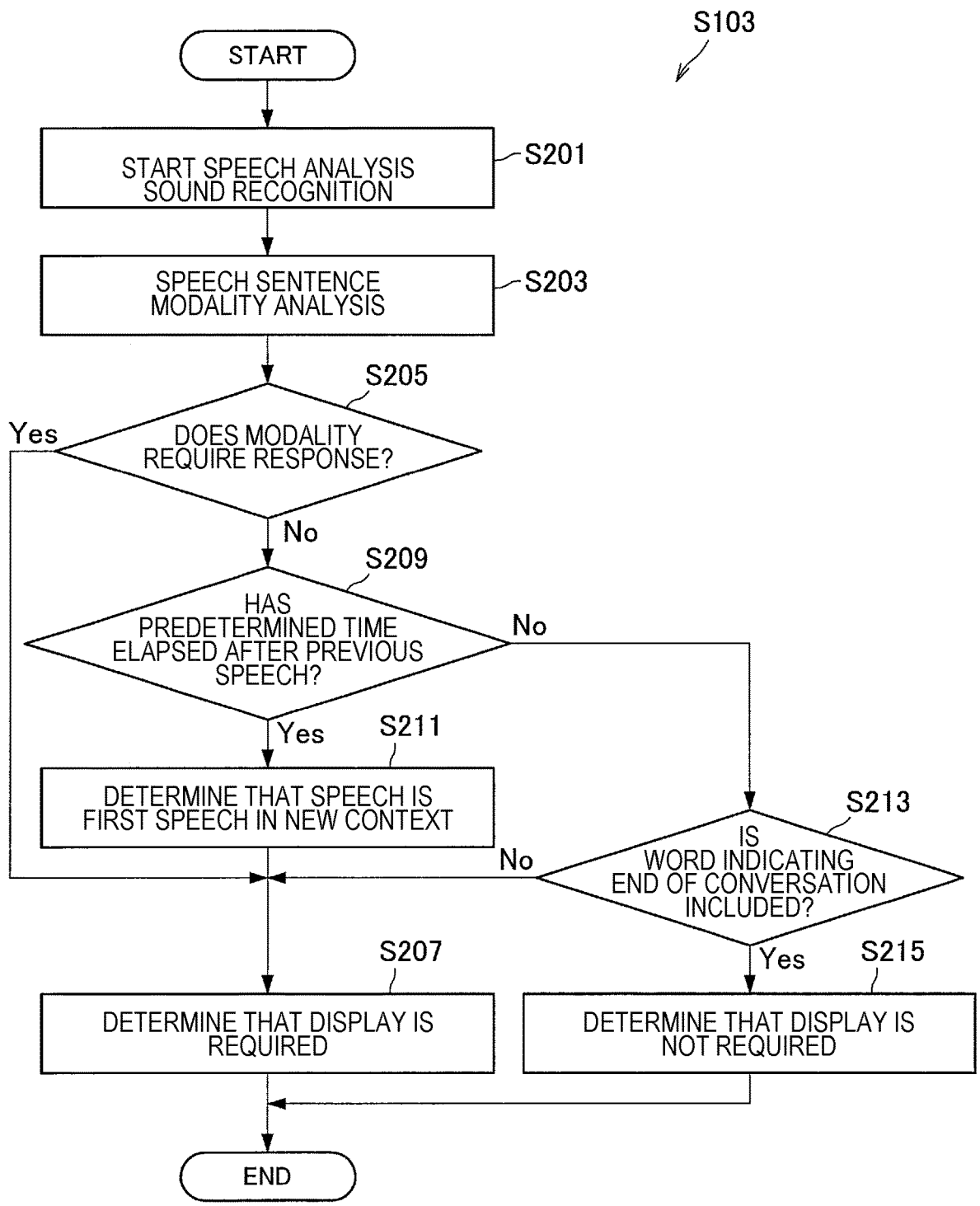
FIG. 14 is a flowchart illustrating a flow of indicator display necessity determination processing according to the first embodiment.

Here, detailed operations in the "indicator display necessity determination processing" in S103 will be described with reference to FIG. 14. As illustrated in FIG. 14, the sound analysis unit 102 performs sound recognition of the sound received in S101 first (S201). Then, the sound analysis unit 102 performs modality analysis of a sentence of the speech on the basis of a result of the sound recognition (S203). Then, in a case in which it is determined that the modality requires a response (S205: Yes), the output control unit 108 determines that it is necessary to display the indicator (S207). Then, the "indicator display necessity determination processing" ends.

Meanwhile in a case in which it is determined that the modality does not require a response (S205: No), then the output control unit 108 determines whether or not a predetermined time has elapsed after the previously detected speech (S209). In a case in which the predetermined time has elapsed after the previous speech (S209: Yes), the output control unit 108 determines that the speech corresponding to the sound received in S101 is the first speech in new context (S211). Then, the output control unit 108 performs the aforementioned processing in S207.

Meanwhile in a case in which the predetermined time has not elapsed after the previous speech (S209: No), the output control unit 108 determines whether or not the result of the sound recognition in S201 includes a word indicating an end of conversation (S213). Here, the word indicating the end of conversation may be "Good-bye", "Bye", "It's time to bed", "See you tomorrow", or the like, for example. In addition, the word indicating the end of conversation may be registered in a word list constructed on the basis of chatting history information. Note that the word list can be constructed on the basis of collection of words from the final speech based on the chatting history information, for example.

In a case in which the result of the sound recognition does not include the word indicating the end of conversation (S213: No), the output control unit 108 performs the aforementioned processing in S207. Meanwhile in a case in which the result of the sound recognition includes the word indicating the end of conversation (S213: Yes), the output control unit 108 determines that it is not necessary to display the indicator (S215). Then, the "indicator display necessity determination processing" ends.

{2-2-3. Reply Time Limit Calculation Processing}

Figure 15:
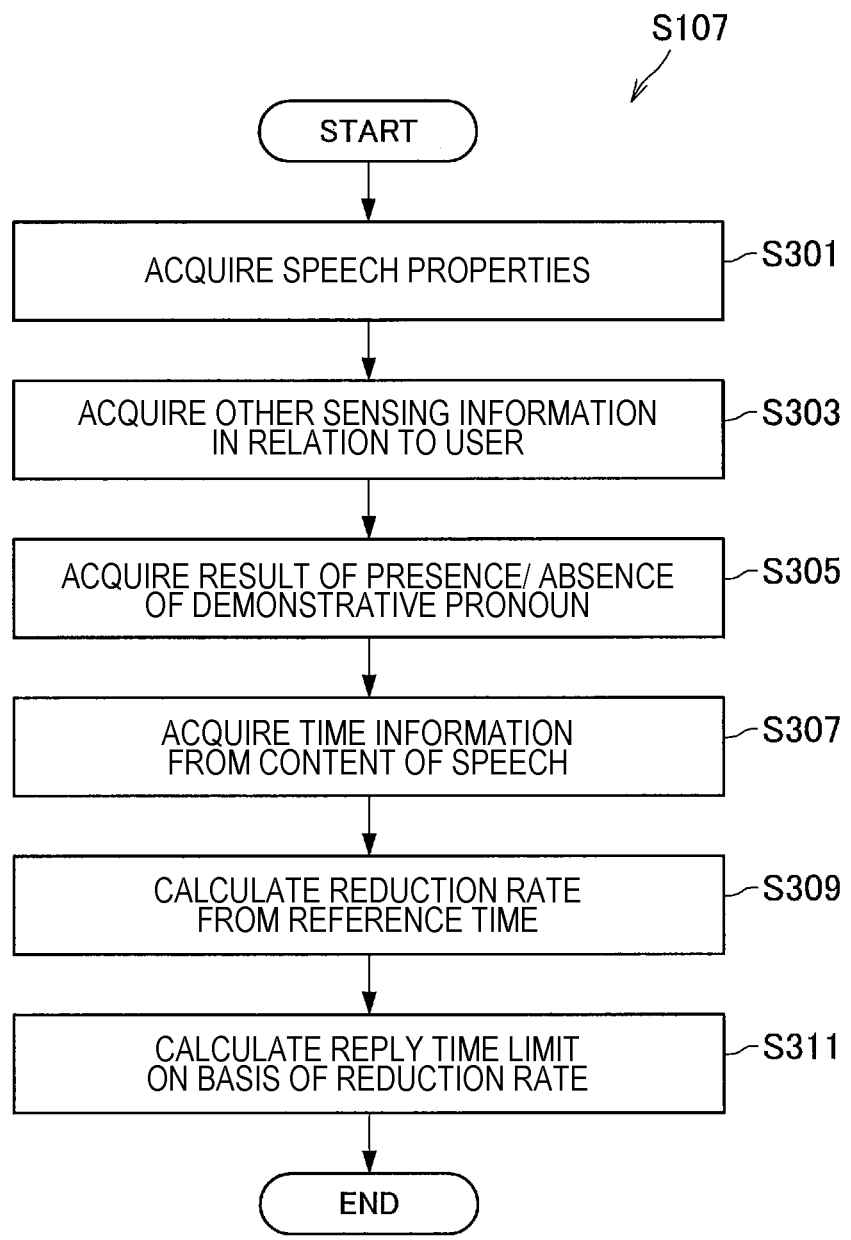
FIG. 15 is a flowchart illustrating a flow of reply time limit calculation processing according to the first embodiment.

Next, detailed operations in the "reply time limit calculation processing" in S107 will be described with reference to FIG. 15. As illustrated in FIG. 15, the reply time limit calculation unit 106 acquires speech properties of the sound analyzed in S201 first (S301). Then, the reply time limit calculation unit 106 acquires sensing information other than the sound, for example, a face image, a result of detecting a line of sight, a result of action reaction, or the like in relation to the sound text chatting user (S303). Note that the sensing information may be transmitted by the terminal 20 to the server 10 along with the sound of the speech in S101 or may be transmitted by the terminal 20 to the server 10 in S303.

Then, the reply time limit calculation unit 106 acquires a result of analyzing presence/absence of a demonstrative pronoun in relation to the sentence of the speech analyzed in S201 (S305).

Then, the reply time limit calculation unit 106 acquires a result of analyzing time information in relation to the sentence of the speech analyzed in S201 (S307).

Then, the reply time limit calculation unit 106 calculates a reduction rate from the reference time on the basis of the information acquired in S301 to S307 and content registered in the time limit calculation DB 124 (S309).

Thereafter, the reply time limit calculation unit 106 calculates the reply time limit by multiplying the reference time by the reduction rate calculated in S309 (S311).

{2-2-4. Indicator Display End Determination Processing}

Figure 16:
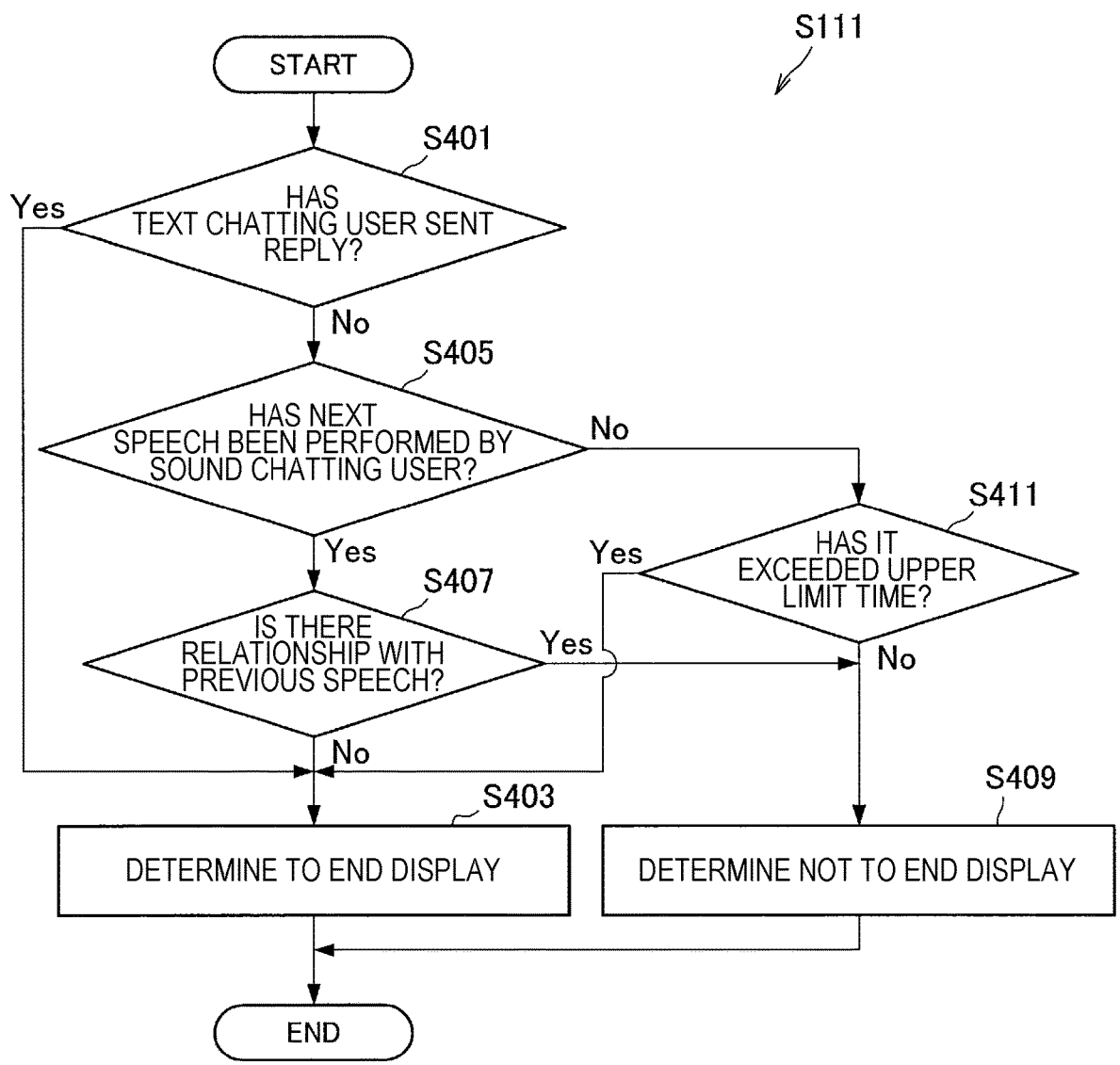
FIG. 16 is a flowchart illustrating a flow of indicator stop determination processing according to the first embodiment.

Next, detailed operation in the "indicator display end determination processing" in S111 will be described with reference to FIG. 16. As illustrated in FIG. 16, the output control unit 108 determines whether or not the text chatting user has already sent a reply, in relation to the speech detected in S101 first (S401). In a case in which the text chatting user has already sent a reply (S401: Yes), the output control unit 108 determines to cause the display of the indicator to end (S403). Then, the "indicator display end determination processing" ends.

Meanwhile, in a case in which the text chatting user has not sent a reply yet (S401: No), the output control unit 108 determines whether or not new speech has been detected from the sound chatting user (S405). In a case in which a new speech has been detected from the sound chatting user (S405: Yes), the output control unit 108 determines whether or not there is some relationship between the detected new speech (hereinafter, referred to as "new speech") and the speech detected in S101 (hereinafter, referred to as target speech) by estimating a relationship between sentences by using a known technology, for example (S407). In a case in which it is estimated that the relationship between the sentences, namely between the sentence of the new speech and the sentence of the target speech is "a relationship based on identity of matters" (for example, "equivalent", "simple". "detailed", "illustrative", "reference", "supplementary", or the like), for example, the output control unit 106 determines that the new speech has a relationship with the target speech (that is, the speech continues).

In a case in which it is determined that the new speech does not have a relationship with the target speech (S407: No), the server 10 performs the aforementioned processing in S403. Meanwhile, in a case in which it is determined that the new speech has a relationship with the target speech (S407: Yes), the output control unit 108 determines not to cause the display of the indicator to end (S409). Thereafter, the "indicator display end determination processing" ends.

In addition, in a case in which the new speech has not been detected in S405 (S405: No), then the output control unit 108 determines whether or not an elapse time after the time when the display of the indicator is started in S109 has exceeded a predetermined upper limit time (S411).

In a case in which the elapsed time has exceeded the upper limit time (S411: Yes), the server 10 performs the aforementioned processing in S403. Meanwhile, in a case in which the elapsed time has not exceeded the upper limit time (S411: No), the server 10 performs the aforementioned processing in S409.

{2-2-5. Modification Example}

Note that the operation in the first embodiment are not limited to the aforementioned example. For example, the processing in S107 illustrated in FIG. 13 may be executed before S103.

<2-3. Advantages>

According to the first embodiment, the server 10 controls an output of the information indicating the waiting status of the sound chatting user on the basis of a detection of speech of the sound chatting user in a situation in which messages are exchanged between the sound chatting user and the text chatting user as described above. In this manner, the text chatting user can ascertain the waiting status of the sound chatting user when the message is input.

For example, the server 10 calculates the reply time limit on the basis of the detection of the speech of the sound chatting user and then causes the display unit 226 on the side of the text chatting user to display the indicator including the calculated reply time limit. Then, the indicator includes a meter indicating a difference between the reply time limit and an elapse time after the time when the display of the indicator is started. In this manner, the text chatting user can know a remaining time that the sound chatting user allows for waiting for a reply of the message at any time. As a result, the text chatting user can determine whether or not the user should hurry to input the message as a reply, for example.

<2-4. Modification Example>

Note that the first embodiment is not limited to the above description. Although the example in which the server 10 causes only the display unit 226b on the side of the text chatting user to display the indicator has been described, for example, the embodiment is not limited to such an example, and the server 10 may also cause the display unit 226a on the side of the sound chatting user to display the same indicator. In this manner, the sound chatting user can ascertain the content of the indicator that the text chatting user is viewing.

3. Second Embodiment

The first embodiment has been described above. As described above, it generally takes a longer time to input the message in the text chatting than in the sound chatting. Thus, it is desirable that the sound chatting user further be able to check the input status of the text chatting user in order to suppress degradation of usability in a situation in which chatting is performed between the sound chatting user and the text chatting user.

Next, a second embodiment will be described. According to the second embodiment, the server 10 can control an output of feedback sound (hereinafter, referred to as FB sound) to the sound chatting user on the basis of an input status of text from the text chatting user as will be described later. Note that an application example in a situation in which the text chatting user performs a sound text input will be described in the second embodiment. However, the second embodiment is not limited to such an example and can be substantially similarly applied to a situation in which the text chatting user performs a text input by using a hardware keyboard, a software keyboard, or the like <3-1. Configuration>

Next, a configuration of the server 10 according to the second embodiment will be described in detail. Note that components included in the server 10 according to the second embodiment are similar to those according to the first embodiment. Hereinafter, only content that is different from that in the first embodiment will be described later.

{3-1-1. Output Control Unit 108}

The output control unit 108 according to the second embodiment causes the sound output unit 228 of the terminal 20 that the sound chatting user uses to output FB sound on the basis of an input status of the text from the text chatting user. In a case in which a sound FB timing set in advance has been reached, for example, the output control unit 108 causes the sound output unit 228 to output the FB sound. Here, the sound FB timing is, for example, "the time when the input of the message is started" "the time when the message is being input", "the time when the input of the message ends", "the time when the message is transmitted", and the like. Note that "the time when the message is being input" is a timing at which the sound volume of the speech has exceeded a predetermined threshold value in a speech period (of the sound text input) detected through voice activity detection (VAD), for example.

For example, the sound FB timing and the type of sound can be registered in advance in associated manner in an FB sound table (omitted in the drawing). In one example, sound "You've got a message from OO." may be registered in association with "the time when the message is transmitted" in the FB sound table. Also, in this case, the output control unit 108 causes the sound output unit 228 to output the FB sound stored in association with the sound FB timing in the FB sound table every time any sound FB timing is reached. Note that the FB sound table can be stored in the storage unit 122.

<3-2. Operations>

Figure 17:
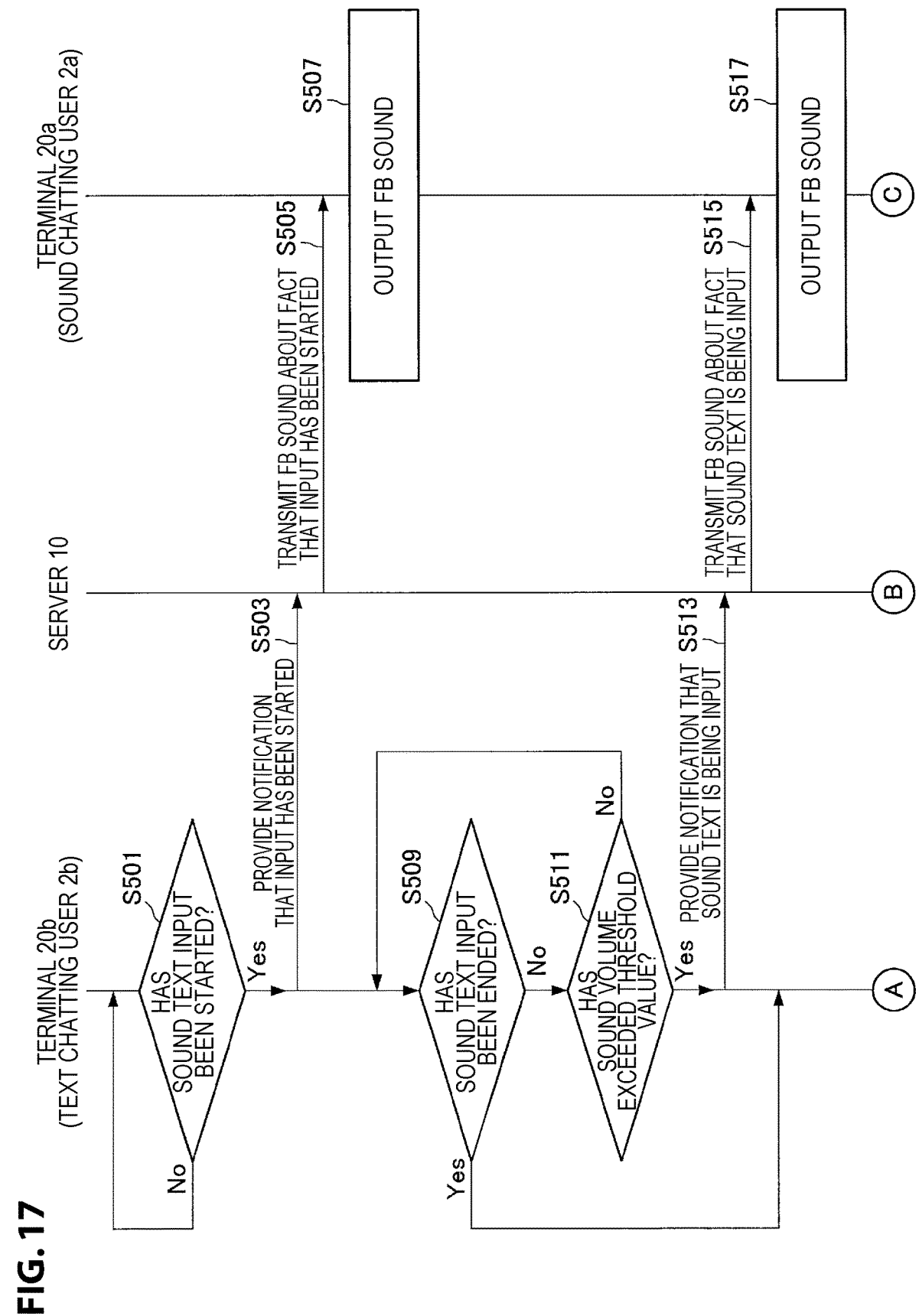
FIG. 17 is a sequence diagram illustrating a part of operations according to a second embodiment.

The configuration according to the second embodiment has been described above. Next, operations according to the second embodiment will be described with reference to FIGS. 17 and 18. As illustrated in FIG. 17, the terminal 20b that the text chatting user uses waits until a sound text input is started by the text chatting user first (S501). Then, in a case in which the sound text input has been started by the text chatting user (S501: Yes), the terminal 20b transmits a notification that the text input has been started to the server 10 (S503).

Thereafter, the output control unit 108 of the server 10 extracts the FB sound that is stored in an FB sound table in association with "the time when the input of the message is started". Then, the communication unit 120 transmits the extracted FB sound to the terminal 20a that the sound chatting user uses under control performed by the output control unit 108 (S505). Thereafter, the terminal 20a outputs the received sound (S507).

In addition, the terminal 20b determines whether or not the sound text input has been ended by the text chatting user after S503 (S509). When the sound text input is being performed (S509: No), the terminal 20b waits until the sound volume of the speech of the text chatting user exceeds a predetermined threshold value (S511). Then, in a case in which the sound volume of the speech has exceeded the predetermined threshold value (S511: Yes), the terminal 20b transmits a notification that the sound text is being input to the server 10 (S513).

Thereafter, the output control unit 108 of the server 100 extracts the FB sound stored in the FB sound table in association with "the time when the message is being input". Then, the communication unit 120 transmits the extracted FB sound to the terminal 20a under control performed by the output control unit 108 (S515). Thereafter, the terminal 20a outputs the received sound (S517).

Figure 18:
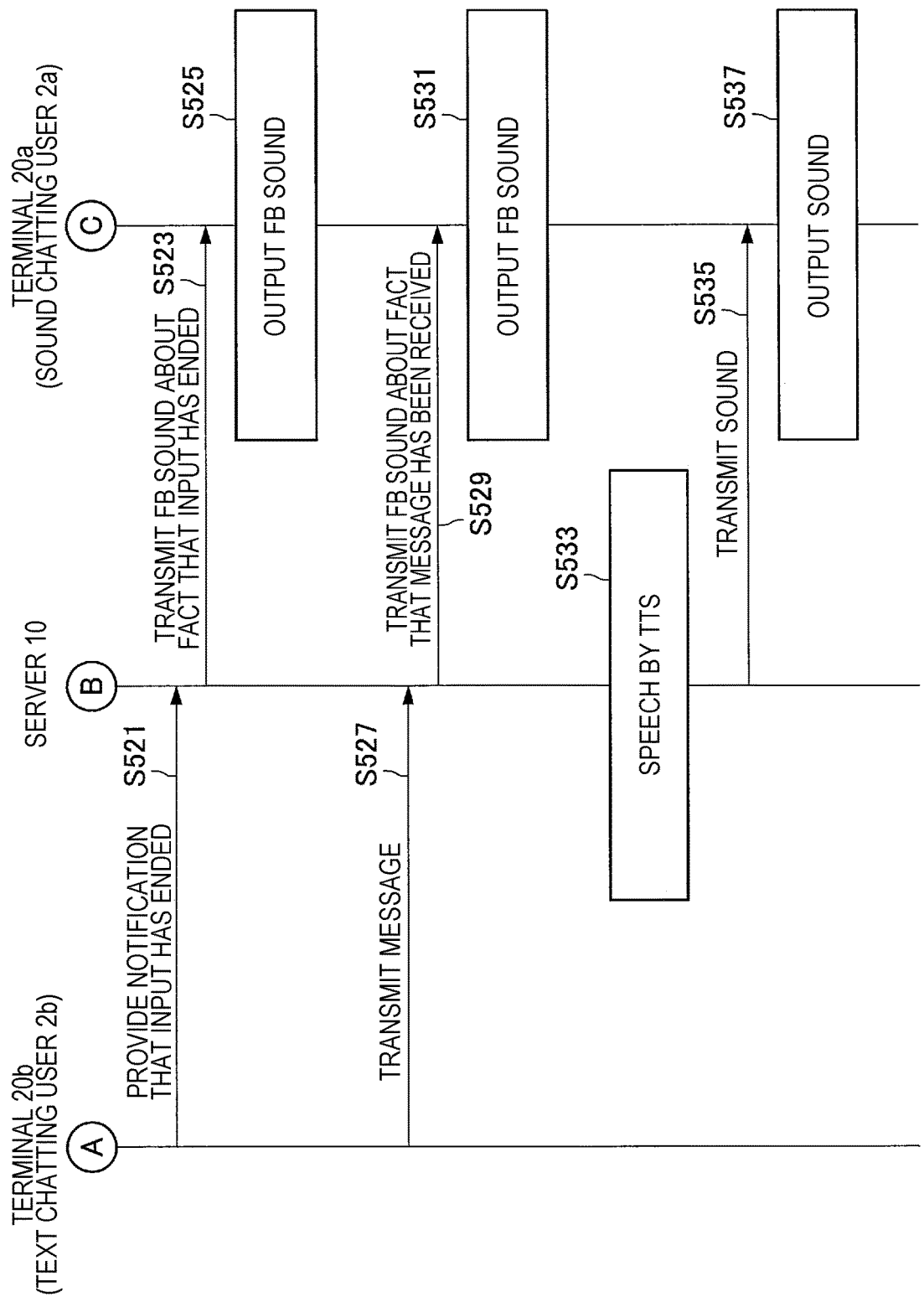
FIG. 18 is a sequence diagram illustrating a part of operations according to a second embodiment.

Here, operations performed in a case in which the sound text input has been ended in S509 (S509: Yes) will be described with reference to FIG. 18. As illustrated in FIG. 18, the terminal 20b transmits a notification that the text input has ended to the server 10 first (S521).

Thereafter, the output control unit 108 of the server 10 extracts the FB sound stored in the FB sound table in association with "the time when the input of the message ends". Then, the communication unit 120 transmits the extracted FB sound to the terminal 20a under control performed by the output control unit 108 (S523). Thereafter, the terminal 20a outputs the received sound (S525).

In addition, the terminal 20b transmits the input message to the server 10 after S521 (S527). Then, the output control unit 108 of the server 10 extracts the FB sound stored in the FB sound table in association with "the time when the message is transmitted". Then, the communication unit 120 transmits the extracted FB sound to the terminal 20a under control performed by the output control unit 108 (S529). Thereafter, the terminal 20a outputs the received sound (S531).

Note that the processing in S533 to S537 illustrated in FIG. 18 is similar to that in S23 to S27 illustrated in FIG. 3.

<3-3. Advantages>

The server 10 according to the second embodiment controls the output of the FB sound to the sound chatting user on the basis of an input status of text from the text chatting user as described above. Therefore, the sound chatting user can check the input status of the text chatting user when the sound chatting user is waiting for a message from the text chatting user. Therefore, it is possible to suppress degradation in usability of the sound chatting user.

4. Third Embodiment

The second embodiment has been described above. As described above, the message input by the text chatting user is delivered to the sound chatting user by TTS reading in the first embodiment and the second embodiment. Incidentally, since the text is generally read flatly in the TTS reading, the user who listens to the read sound tends to fail to hear information. As a result, there is a case in which smoothness of the communication between the sound chatting user and the text chatting user is degraded.

Next, a third embodiment will be described. According to the third embodiment, the server 10 can cause an output form of sound of a message output to the sound chatting user to change on the basis of extraction of keywords from the message input by the text chatting user as will be described later. In this manner, it is possible to suppress the sound chatting user from failing to hear an important portion of the message from the text chatting user. Here, the keywords can be words that indicate a date and time, a location, and the like, for example.

<4-1. Configuration>

Next, a configuration of the server 10 according to the third embodiment will be described in detail. Note that components included in the server 10 according to the third embodiment are similar to those according to the first embodiment.

{4-1-1. Output Control Unit 108}

The output control unit 108 according to the third embodiment causes an output form of the sound of the message output to the sound chatting user to change on the basis of extraction of a keyword from the message input by the text chatting user.

For example, the output control unit 108 can increase the number of times the sound of the keyword extracted from the input message is output. In one example, the output control unit 108 causes the sound output unit 228a on the side of the sound chatting user to output the sound of the message input by the text chatting user first, and the output control unit 108 then causes the sound output unit 228a to output only the sound of the keyword extracted from the message. In one example, it is assumed that message "Ok, I'll meet you at the trolley room at 9 tomorrow." is input by the text chatting user and "tomorrow", "9", and "the trolley room" are extracted as keywords. In this case, the output control unit 108 causes the sound output unit 228a to output the sound "Ok, I'll meet you at the trolley room at 9 tomorrow." first and then causes the sound output unit 228a to output sound of only the keywords such as "tomorrow, 9, the trolley room" by TTS.

Alternatively, the output control unit 108 can cause the sound of the message to be output by differentiating the sound of keyword portions extracted from the input message. For example, the output control unit 108 causes the sound output unit 228a to output the sound of the message by TTS by causing the sound volume of the keyword portions extracted from the input message to be higher than the sound volume of portions other than the keywords. Alternatively, the output control unit 108 may cause the sound output unit 228a to output the sound of the message by TTS by differentiating a type of sound at the keyword portions extracted from the input message from a type of sound of portions other than the keywords.

Alternatively, the output control unit 108 can cause the sound of the message to be output by differentiating the speed of the sound of the keyword portions extracted from the input message. For example, the output control unit 108 may cause the sound output unit 228a to output the sound of the message by TTS by temporarily stopping the output of the sound before and after the keywords extracted from the input message and reducing the speed of the sound of the keyword portions to 0.8 times, for example, as high as the speed of the sound of the portions other than the keywords.

<4-2. Operations>

Figure 19:
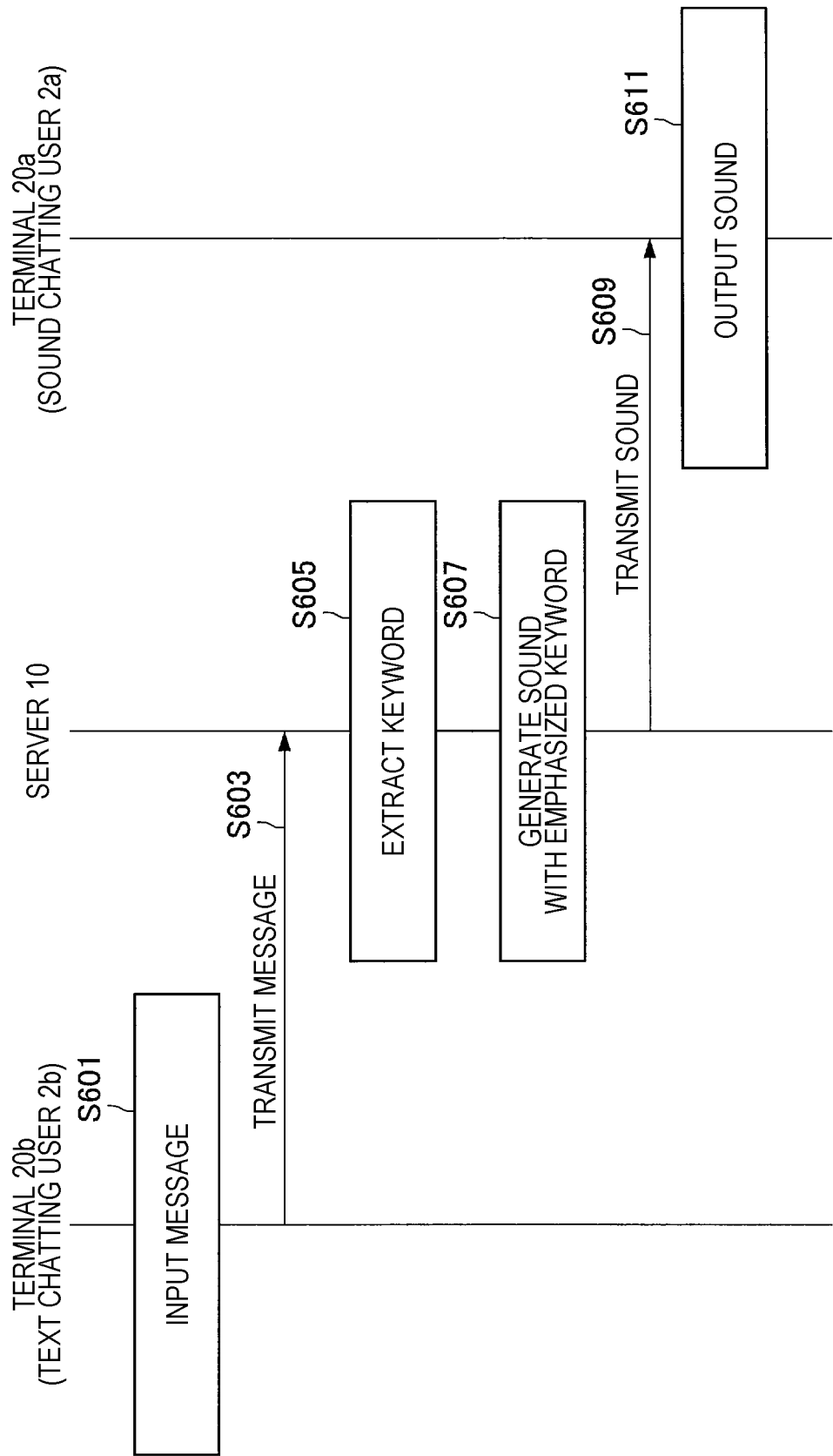
FIG. 19 is a sequence diagram illustrating operations according to a third embodiment.

The configuration according to the third embodiment has been described above. Next, operations according to the third embodiment will be described with reference to FIG. 19. As illustrated in FIG. 19, the text chatting user inputs a message to the terminal 20b (S601). Then, the terminal 20b transmits the input message to the server 10 (S603).

Thereafter, the output control unit 108 of the server 10 extracts a keyword from the received message (S605). Then, the output control unit 108 generates sound with the keyword emphasized by TTS in relation to the message on the basis of the received message and the extracted keyword (S607).

Thereafter, the communication unit 120 transmits the generated sound to the terminal 20a under control performed by the output control unit 108 (S609). Thereafter, the terminal 20a outputs the received sound (S611).

<4-3. Advantages>

The server 10 according to the third embodiment causes the output form of the sound of the message output to the sound chatting user to change on the basis of the extraction of the keyword from the message input by the text chatting user as described above. Therefore, the sound chatting user can more reliably listen to the keyword included in the message. As a result, it is possible to realize smooth communication, and for example, the number of times the sound chatting user asks the text chatting user to speak again decreases.

5. Fourth Embodiment

The third embodiment has been described above. Incidentally, even if the text chatting user produces sound during the speech of the sound chatting user in a situation in which chatting is performed between the sound chatting user and the text chatting user, the sound is generally not delivered to the sound chatting user. Therefore, since the sound chatting user cannot obtain sound information indicating that the text chatting is listening, such as an interjection, for example, the sound chatting user can feel that it is difficult to perform natural communication.

Next, the fourth embodiment will be described. According to the fourth embodiment, the server 10 can control automatic sound output of an interjection by TTS to the sound chatting user on the basis of the detection of the speech of the sound chatting user as will be described later.

<5-1. Configuration>

Next, a configuration of the server 10 according to the fourth embodiment will be described in detail. Note that components included in the server 10 according to the fourth embodiment are similar to those according to the first embodiment.

[5-1-1. Output Control Unit 108]

The output control unit 108 according to the fourth embodiment controls the sound output of the interjection by the TTS to the sound chatting user on the basis of the result of estimating whether or not the text chatting user is listening in a case in which the speech of the sound chatting user has been detected. In a case in which the speech of the sound chatting user has been detected and it is estimated that the text chatting user is listening to the speech of the sound chatting user, for example, the output control unit 108 causes the sound output unit 228 on the side of the sound chatting user to output the sound as the interjection by the TTS. In one example, when the sound volume of the speech of the sound chatting user relatively decreases after the speech of the sound chatting user is detected, or when a predetermined time has elapsed after interruption of the speech of the sound chatting user, the output control unit 108 causes the sound output unit 228 on the side of the sound chatting user to output the sound as the interjection by TTS.

Note that the output control unit 108 can estimate whether or not the text chatting user is listening to the speech of the sound chatting user by the following methods, for example. For example, the output control unit 108 may determine whether or not the text chatting user is listening to the speech on the basis of whether the sound of the speech of the sound chatting user has been output to the sound output unit 228b on the side of the text chatting user. Alternatively, the output control unit 108 may determine whether or not the text chatting user is listening to the speech on the basis of a result of detecting whether or not the text chatting user is wearing an earphone or a headphone. Alternatively, the output control unit 108 may determine whether or not the text chatting user is listening to the speech on the basis of a result of action recognition of the text chatting user. In a case in which the sound chatting user and the text chatting user are playing a computer game, for example, the output control unit 108 may determine whether or not the text chatting user is listening to the speech on the basis of a result of detecting a degree of concentration of the text chatting user on the computer game. Note that the degree of concentration on the computer game can be determined on the basis of a result of detecting a frequency of operations performed on the operation unit 222b, a result of detecting a line of sight of the text chatting user, and a status of the game when the speech of the sound chatting user is detected, and the like, for example.

An application example in a situation in which speech "What should I do?I have only 10,000 rupees now." is performed by the sound chatting user and the sound volume temporarily decreases immediately after the speech "What should I do?" will be described as an example. In this case, the output control unit 108 causes the sound output unit 228 to output sound as an interjection by the TTS, for example, "Uh-huh" first immediately after the speech "What should I do?". Then, the output control unit 108 may cause the sound output unit 228a to output sound as an interjection by TIS, for example, "I see." immediately after the speech "I have only 10,000 rupees now."

<5-2. Operations>

Figure 20:
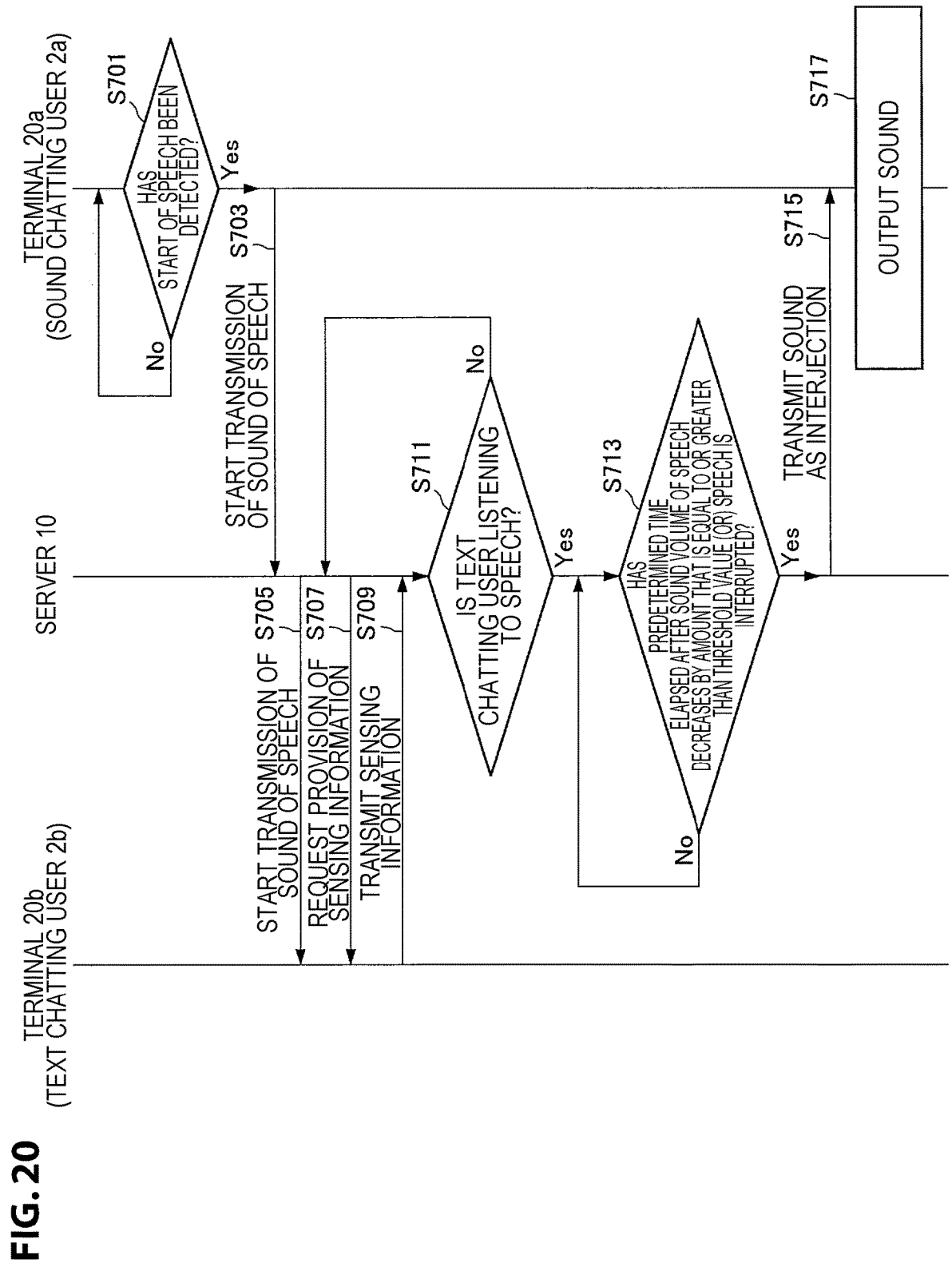
FIG. 20 is a sequence diagram illustrating operations according to a fourth embodiment.

The configuration according to the fourth embodiment has been described above. Next, operations according to the fourth embodiment will be described with reference to FIG. 20. As illustrated in FIG. 20, the terminal 20a that the sound chatting user uses waits for the speech of the sound chatting user being detected first (S701). Then, in a case in which the speech of the sound chatting user is detected (S701: Yes), the terminal 20a successively transmits sound of the detected speech to the server 10 (S703).

Thereafter, the communication unit 120 of the server 10 transmits the received sound to the terminal 20b that the text chatting user uses under control performed by the control unit 100 (S705). Further, the communication unit 120 transmits a request for providing sensing information to the terminal 20b (S707).

Thereafter, the terminal 20b transmits the sensing information, such as a result of measurement performed by the measurement unit 224, for example, to the server 10 (S709).

Thereafter, the output control unit 108 of the server 10 determines whether or not the text chatting user is listening to the speech of the sound chatting user on the basis of the received sensing information (S711). In a case in which it is determined that the text chatting user is not listening to the speech of the sound chatting user (S711: No), the server 10 performs the processing in S707 again.

Meanwhile, in a case in which it is determined that the text chatting user is listening to the speech of the sound chatting user (S711: Yes), the server 10 waits until the sound volume of the speech of the sound chatting user decreases by an amount that is equal to or greater than a threshold value or until the speech of the sound chatting user is interrupted and a predetermined time elapses after the interruption timing (S713).

Then, in a case in which the condition in S713 is met (S713: Yes), the output control unit 108 generates sound as an interjection by TTS. Then, the communication unit 120 transmits the generated sound to the terminal 20a under control performed by the output control unit 108 (S715). Thereafter, the terminal 20a outputs the received sound (S717).

{5-2-1. Modification Example}

Note that the operations according to the fourth embodiment are not limited to the aforementioned example. For example, the terminal 20b may automatically transmit the sensing information to the server 10 without performing the processing in S707. For example, the terminal 20b may constantly acquire the sensing information and transmit the acquired sensing information to the server 10 at predetermined time intervals.

<5-3. Advantages>

As described above, the server 10 according to the fourth embodiment controls sound output of an interjection by TTS to the sound chatting user on the basis of a result of estimating whether or not the text chatting user is listening in a case in which the speech of the sound chatting user is detected. Therefore, it is possible to let the sound chatting user to intuitively know that the text chatting user is listening to the speech of the sound chatting user. Therefore, the sound chatting user can perform communication more naturally.

6. Hardware Configuration

Next, a hardware configuration of the server 10 shared by the respective embodiments will be described with reference to FIG. 21. As illustrated in FIG. 21, the server 10 includes a CPU 150, a read only memory (ROM) 152, a RAM 154, a bus 156, an interface 158, a storage device 160, and a communication device 162.

The CPU 150 functions as an arithmetic processing device and a control device and controls overall operations in the server 10 in accordance with various programs. In addition, the CPU 150 realizes the functions of the control unit 100 in the server 10. Note that the CPU 150 is formed by a processor such as a microprocessor.

The ROM 152 stores control data such as programs and arithmetic parameters used by the CPU 150.

The RAM 154 temporarily stores programs and the like that are executed by the CPU 150, for example.

The bus 156 includes a CPU bus or the like. The bus 156 connects the CPU 150, the ROM 152, and the RAM 154 to each other.

The interface 158 connects the storage device 160 and the communication device 162 to the bus 156.

The storage device 160 is a data storage device that functions as the storage unit 122. The storage device 160 includes, for example, a recording medium, a recording device that records data in the recording medium, a reading device that reads the data from the recording medium, a deletion device that deletes the data recorded in the recording medium, or the like.

The communication device 162 is a communication interface that includes a communication device or the like for being connected to the communication network 30 or the like, for example. In addition, the communication device 162 may be a wireless LAN compatible communication device, a long term evolution (LTE) compatible communication device, or a wired communication device that performs wired communication. The communication device 162 functions as the communication unit 120.

7. Modified Example

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the configuration of the information processing system according to the respective embodiments are not limited to the aforementioned examples. For example, the sound chatting user and the text chatting user may use mutually different types of terminals. In one example, the terminal that the sound chatting user uses may not be provided with the display unit 226 while the terminal that the text chatting user uses may be provided with the display unit 226.

In addition, although the example in which the server 10 has the sound analysis unit 102 and the feeling estimation unit 104 has been described in the aforementioned respective embodiments, the embodiments are not limited to such an example. For example, the terminals 20 instead of the server 10 may have the functions of the sound analysis unit 102. In this case, it is also possible for the terminals 20 to analyze content of the speech of the sound text chatting user. In addition, the terminals 20 may have a part or an entirety of the functions of the feeling estimation unit 104.

Further, the steps of the operation according to each of the above-described embodiments do not necessarily have to be executed in the described order. For example, the order in which the steps are executed may be changed as appropriate. Further, the steps may be partially executed in parallel or individually instead of being executed in chronological order.

Further, according to each of the above-described embodiments, it is possible to provide a computer program for causing hardware such as the CPU 150, the ROM 152, and the RAM 154 to execute a function equivalent to that of each component of the server 10 according in each embodiment described above. Further, there is also provided a recording medium having the computer program recorded thereon.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an output control unit that controls an output of information indicating a waiting status of a first user in relation to a reply from a second user who uses a text input, on a basis of detection of speech of the first user who uses a sound input, in which input messages are exchanged between the first user and the second user.

(2)

The information processing apparatus according to (1), in which the information indicating the waiting status of the first user includes a message reply time limit.

(3)

The information processing apparatus according to (2), further including:

a reply time limit calculation unit that calculates the message reply time limit on a basis of a predetermined reference.

(4)

The information processing apparatus according to (3), in which the predetermined reference includes a property of detected speech of the first user.

(5)

The information processing apparatus according to (4), in which the property of the speech include a sound volume or a speaking speed of the speech.

(6)

The information processing apparatus according to any one of (3) to (5), in which the predetermined reference includes a result of feeling estimation based on detected speech of the first user.

(7)

The information processing apparatus according to any one of (3) to (6), in which the predetermined reference includes a result of sensing in relation to a state of the first user.

(8)

The information processing apparatus according to any one of (3) to (7) in which the predetermined reference includes a result of sound recognition of detected speech of the first user.

(9)

The information processing apparatus according to any one of (2) to (8), in which the information indicating the waiting status of the first user includes an indicator, and the indicator indicates a difference between the message reply time limit and elapse time from a start of display of the indicator.

(10)

The information processing apparatus according to (9), in which the output control unit causes a display mode of the indicator to change with elapse of a time from the start of the display of the indicator.

(11)

The information processing apparatus according to any one of (1) to (10), in which the information indicating the waiting status of the first user includes a result of feeling estimation based on the detected speech of the first user.

(12)

The information processing apparatus according to any one of (1) to (11), in which the output control unit further causes an output unit to start to output the information indicating the waiting status of the first user on a basis of a result of sound recognition of the detected speech of the first user.

(13)

The information processing apparatus according to (12), in which the output control unit further causes the output unit to start to output the information indicating the waiting status of the first user on a basis of a result of modality analysis performed on a result of the sound recognition.

(14)

The information processing apparatus according to any one of (1) to (13), in which the output control unit causes an output unit to end outputting of the information indicating the waiting status of the first user on a basis of an input of a message from the second user after the output of the information indicating the waiting status of the first user is started.

(15)

The information processing apparatus according to any one of (1) to (14), in which the output control unit causes an output unit to end outputting of the information indicating the waiting status of the first user on a basis of an elapse time from a start of the output of the information indicating the waiting status of the first user after the output of the information indicating the waiting status of the first user is started.

(16)

The information processing apparatus according to any one of (1) to (15), in which the output control unit further controls an output of feedback sound to the first user on a basis of an input status of text from the second user after the detection of the speech of the first user.

(17)

The information processing apparatus according to any one of (1) to (16), in which the output control unit further causes an output form of sound of a message output to the first user to be changed on a basis of extraction of a keyword from the message input from the second user.

(18)

The information processing apparatus according to any one of (1) to (17), in which the output control unit further controls a sound output of an interjection to the first user on a basis of the detection of the speech of the first user.

(19)

An information processing method including:

controlling, by a processor, an output of information indicating a waiting status of a first user in relation to a reply from a second user who uses a text input, on a basis of detection of speech of the first user who uses a sound input, in which input messages are exchanged between the first user and the second user.

(20)

A program that causes a computer to function as:

an output control unit that controls an output of information indicating a waiting status of a first user in relation to a reply from a second user who uses a text input, on a basis of detection of speech of the first user who uses a sound input, in which input messages are exchanged between the first user and the second user.

REFERENCE SIGNS LIST 10 server
20 terminal
30 communication network
100,200 control unit
102 sound analysis unit
104 feeling estimation unit
106 reply time limit calculation unit
108 output control unit
120,230 communication unit
122 storage unit
124 time limit calculation DB
126 speech property coefficient table
128 sensing information coefficient table
130 demonstrative pronoun presence/absence coefficient table
132 time information coefficient table
220 sound collecting unit
222 operation unit
224 measurement unit
226 display unit
228 sound output unit

The invention claimed is:

1. An information processing apparatus comprising:
an output control unit that controls an output of information indicating a waiting status of a first user in relation to a reply from a second user who uses a text input, on a basis of detection of speech of the first user who uses a sound input,
wherein input messages are exchanged between the first user and the second user.

2. The information processing apparatus according to claim 1, wherein the information indicating the waiting status of the first user includes a message reply time limit.

3. The information processing apparatus according to claim 2, further comprising:
a reply time limit calculation unit that calculates the message reply time limit on a basis of a predetermined reference.

4. The information processing apparatus according to claim 3, wherein the predetermined reference includes a property of detected speech of the first user.

5. The information processing apparatus according to claim 4, wherein the property of the speech include a sound volume or a speaking speed of the speech.

6. The information processing apparatus according to claim 3, wherein the predetermined reference includes a result of feeling estimation based on detected speech of the first user.

7. The information processing apparatus according to claim 3, wherein the predetermined reference includes a result of sensing in relation to a state of the first user.

8. The information processing apparatus according to claim 3, wherein the predetermined reference includes a result of sound recognition of detected speech of the first user.

9. The information processing apparatus according to claim 2,
wherein the information indicating the waiting status of the first user includes an indicator, and
the indicator indicates a difference between the message reply time limit and elapse time from a start of display of the indicator.

10. The information processing apparatus according to claim 9, wherein the output control unit causes a display mode of the indicator to change with elapse of a time from the start of the display of the indicator.

11. The information processing apparatus according to claim 1, wherein the information indicating the waiting status of the first user includes a result of feeling estimation based on the detected speech of the first user.

12. The information processing apparatus according to claim 1, wherein the output control unit further causes an output unit to start to output the information indicating the waiting status of the first user on a basis of a result of sound recognition of the detected speech of the first user.

13. The information processing apparatus according to claim 12, wherein the output control unit further causes the output unit to start to output the information indicating the waiting status of the first user on a basis of a result of modality analysis performed on a result of the sound recognition.

14. The information processing apparatus according to claim 1, wherein the output control unit causes an output unit to end outputting of the information indicating the waiting status of the first user on a basis of an input of a message from the second user after the output of the information indicating the waiting status of the first user is started.

15. The information processing apparatus according to claim 1, wherein the output control unit causes an output unit to end outputting of the information indicating the waiting status of the first user on a basis of an elapse time from a start of the output of the information indicating the waiting status of the first user after the output of the information indicating the waiting status of the first user is started.

16. The information processing apparatus according to claim 1, wherein the output control unit further controls an output of feedback sound to the first user on a basis of an input status of text from the second user after the detection of the speech of the first user.

17. The information processing apparatus according to claim 1, wherein the output control unit further causes an output form of sound of a message output to the first user to be changed on a basis of extraction of a keyword from the message input from the second user.

18. The information processing apparatus according to claim 1, wherein the output control unit further controls a sound output of an interjection to the first user on a basis of the detection of the speech of the first user.

19. An information processing method comprising:
controlling, by a processor, an output of information indicating a waiting status of a first user in relation to a reply from a second user who uses a text input, on a basis of detection of speech of the first user who uses a sound input,
wherein input messages are exchanged between the first user and the second user.

20. A program that causes a computer to function as:
an output control unit that controls an output of information indicating a waiting status of a first user in relation to a reply from a second user who uses a text input, on a basis of detection of speech of the first user who uses a sound input,
wherein input messages are exchanged between the first user and the second user.

* * * * *